US012691848B2

(12) United States Patent
Wang et al.

(10) Patent No.: US 12,691,848 B2
(45) Date of Patent: Jul. 28, 2026

(54) RIDING MOWING DEVICE

(71) Applicant: Nanjing Chervon Industry Co., Ltd., Nanjing (CN)

(72) Inventors: Lei Wang, Nanjing (CN); Li Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 227 days.

(21) Appl. No.: 18/519,247

(22) Filed: Nov. 27, 2023

(65) Prior Publication Data

US 2024/0190386 A1 Jun. 13, 2024

(30) Foreign Application Priority Data

Dec. 7, 2022 (CN) .......................... 202211560187.1
Oct. 13, 2023 (CN) .......................... 202311339212.8

(51) Int. Cl.
*B60R 25/24* (2013.01)
*B60R 25/045* (2013.01)

(52) U.S. Cl.
CPC ............ *B60R 25/24* (2013.01); *B60R 25/045* (2013.01); *B60Y 2200/223* (2013.01)

(58) Field of Classification Search
CPC .. B60R 25/24; B60R 25/045; B60Y 2200/223
See application file for complete search history.

(56) References Cited

U.S. PATENT DOCUMENTS

| | | | | |
|---|---|---|---|---|
| 10,980,174 B2 * | 4/2021 | Bassett | ............... | A01D 34/822 |
| 11,229,161 B1 * | 1/2022 | Patterson | ........... | A01D 34/6806 |
| 11,808,243 B2 * | 11/2023 | Albinger | ............... | F02N 11/108 |
| 2006/0201122 A1 * | 9/2006 | Bishop | .................. | A01D 75/30 |
| | | | | 56/15.6 |
| 2007/0294991 A1 * | 12/2007 | Medina | .................. | A01D 43/16 |
| | | | | 56/11.9 |
| 2009/0027177 A1 | 1/2009 | Hodder | | |
| 2014/0230393 A1 * | 8/2014 | Hansen | ................. | F02N 11/101 |
| | | | | 56/10.5 |
| 2014/0266664 A1 * | 9/2014 | Dwyer | ................. | A01D 34/006 |
| | | | | 340/459 |

(Continued)

FOREIGN PATENT DOCUMENTS

| | | |
|---|---|---|
| CN | 101625775 A | 1/2010 |
| CN | 203511575 U | 4/2014 |

(Continued)

*Primary Examiner* — Thomas D Alunkal
(74) *Attorney, Agent, or Firm* — Greenberg Traurig, LLP

(57) ABSTRACT

A riding mowing device includes a keyless start system which allows a user to start the riding mowing device without a key. The keyless start system includes an authentication module and a controller. The authentication module is configured to authenticate the validity of a smart key of the user. The controller is electrically connected to at least the power supply assembly, where the controller controls the riding mowing device to switch from a locked mode to an unlocked mode after the validity authentication of the smart key succeeds. In the locked mode, the riding mowing device cannot walk or perform a mowing function, and in the unlocked mode, the riding mowing device can walk or perform the mowing function.

14 Claims, 18 Drawing Sheets

(56)     References Cited

U.S. PATENT DOCUMENTS

2015/0007541 A1*   1/2015  Albinger .............. A01D 34/001
                                                    56/10.2 A
2018/0263182 A1*   9/2018  Albinger .............. G05D 1/0278
2020/0318553 A1    10/2020 Dixon
2023/0380339 A1*   11/2023 Dively .................. A01D 34/78

FOREIGN PATENT DOCUMENTS

| CN | 203902480  | U  | 10/2014 |
| CN | 113246912  | A  | 8/2021  |
| CN | 214430195  | U  | 10/2021 |
| CN | 113978413  | A  | 1/2022  |
| CN | 114095924  | A  | 2/2022  |
| KR | 20180060606 | A | 6/2018  |
| WO | 2016108105 | A1 | 7/2016  |

\* cited by examiner

100

100

121

20

13

15

1510

1511

1512

1513

1514

1531

40

31

200

300

RIDING MOWING DEVICE

RELATED APPLICATION INFORMATION

This application claims the benefit under 35 U.S.C. § 119(a) of Chinese Patent Application No. 202211560187.1, filed on Dec. 7, 2022, and Chinese Patent Application No. 202311339212.8, filed on Oct. 13, 2023, which applications are incorporated herein by reference in their entireties.

TECHNICAL FIELD

The present application relates to a garden tool and, in particular, to a riding mowing device.

BACKGROUND

As a garden tool, a mowing device is widely used in the field of trimming lawns, vegetation, and the like. A riding mowing device is more labor-saving and more efficient in mowing than a push mowing device. In the existing market, each of riding mowing devices is equipped with a manual key. A user needs to perform the tedious operation of taking out a manual key to insert the manual key into a lock, open the lock, start a riding mowing device, close the lock, and pull out the key, which is very inconvenient.

A keyless start system has become a standard configuration in the automobile market due to its convenient operation mode and safe anti-theft function. Although a keyless start control strategy has tended to be mature in automobiles, a conventional keyless start system of an automobile is too complicated and is not applicable to the riding mowing device because the power system of the automobile is much different from that of the mowing device.

Therefore, how to apply a keyless start system to the riding mowing device to provide better user experience has become a technical problem to be solved in the art.

This part provides background information related to the present application, which is not necessarily the existing art.

SUMMARY

The present application provides a riding mowing device, and the riding mowing device includes a keyless start system capable of implementing smart unlocking and locking.

In a first aspect, the present application provides a riding mowing device including a frame, a cutting assembly, a walking assembly, a power supply assembly, and a keyless start system. The cutting assembly includes a deck and a mowing element at least partially accommodated in the deck. The walking assembly is used for driving the riding mowing device to walk. The power supply assembly is used for supplying power to at least the cutting assembly and the walking assembly and mounted to the frame.

The keyless start system includes an authentication module and a controller. The authentication module is configured to authenticate the validity of a smart key of a user. The controller is electrically connected to at least the power supply assembly, where the controller controls the riding mowing device to switch from a locked mode to an unlocked mode after the validity authentication of the smart key succeeds. In the locked mode, the controller prohibits the cutting assembly and/or the walking assembly from switching to a working state, and in the unlocked mode, the controller allows the cutting assembly and/or the walking assembly to switch to the working state.

In some examples, in the unlocked mode, the controller is capable of controlling the cutting assembly and/or the walking assembly to be in the working state or a braking state, where in the working state, the cutting assembly performs cutting work, and/or the walking assembly drives the riding mowing device to walk, and in the braking state, the cutting assembly does not perform the cutting work, and the walking assembly does not drive the riding mowing device to walk.

In some examples, in the locked mode, the controller prohibits the power supply assembly from supplying the power to the cutting assembly and/or the walking assembly, and in the unlocked mode, the controller allows the power supply assembly to supply the power to the cutting assembly and/or the walking assembly.

In some examples, in the unlocked mode, the controller is capable of controlling the cutting assembly and/or the walking assembly to be in the braking state, where in the braking state, the cutting assembly does not perform the cutting work, and the walking assembly does not drive the riding mowing device to walk.

In some examples, the riding mowing device is capable of being controlled to switch from the locked mode to the unlocked mode after the smart key of the user establishes a communication connection to the keyless start system.

In some examples, the keyless start system further includes a broadcast module capable of broadcasting a predetermined signal. The keyless start system is configured to: authenticate, through the authentication module, the validity of a smart key entering a radiation region of the predetermined signal; and control, through the controller, the riding mowing device to switch from the locked mode to the unlocked mode after the validity authentication of the smart key succeeds.

In some examples, a broadcast switch module is configured to enable and disable the broadcast module.

In some examples, the broadcast switch module is configured to, when the riding mowing device is in the unlocked mode, control the broadcast module to stop broadcasting the predetermined signal.

In some examples, the broadcast switch module includes a pressure sensing unit mounted to the seat, and the broadcast switch module is configured to, when the riding mowing device is in the locked mode and the pressure sensing unit detects that the seat bears pressure, control the broadcast module to begin broadcasting the predetermined signal.

In some examples, the smart key includes a monitoring module and a determination module. The monitoring module is configured to monitor the predetermined signal, where the predetermined signal is a signal broadcast by the riding mowing device in the radiation region. The determination module is configured to, when the predetermined signal is monitored by a monitoring module, determine that the smart key enters the radiation region, where the smart key entering the radiation region is used by the riding mowing device to control, based on a result of the validity authentication of the smart key, the riding mowing device to switch from the locked mode to the unlocked mode.

In some examples, the radiation region includes a first region and a second region, where a radial distance of the first region relative to the riding mowing device is greater than a radial distance of the second region relative to the riding mowing device. The keyless start system further includes a connection module configured to be connected to the smart key, where the connection module is pre-connected or connected to the smart key in the first region. The authentication module performs identity verification on the smart key in the second region.

In some examples, the smart key is a digital key using Bluetooth or near-field communication (NFC) as a communication medium.

In some examples, the smart key is a low-frequency key using an electromagnetic wave of 125 kHz or 434 kHz as a communication medium.

In some examples, the smart key is a mobile terminal of the user, where the mobile terminal establishes the communication connection to the keyless start system through wireless fidelity (Wi-Fi), NFC, or Bluetooth.

In some examples, the riding mowing device sends an alarm signal after the validity authentication of the smart key fails multiple times.

In some examples, the controller controls the riding mowing device to be in the locked mode within a preset time after the validity authentication of the smart key fails multiple times.

In some examples, the smart key includes an operation button, where the operation button is capable of transmitting a remote control signal to the keyless start system so as to control the riding mowing device to work.

In some examples, the remote control signal includes signals for controlling the power supply assembly, the walking assembly, and the cutting assembly.

In some examples, when the remote control signal is a control instruction to control the power supply assembly to start or stop, the controller is capable of controlling, according to the control instruction, the power supply assembly to start or stop.

In some examples, when the remote control signal is a control instruction to control the walking assembly to start, stop, or adjust a speed, the controller is capable of controlling, according to the control instruction, the walking assembly to start, stop, or adjust the speed.

In some examples, when the remote control signal is a control instruction to control the cutting assembly to start or stop, the controller is capable of controlling, according to the control instruction, the cutting assembly to start or stop.

In some examples, a power supply of the keyless start system includes the power supply assembly.

In some examples, a power supply of the keyless start system includes energy recovered by the riding mowing device when braking.

In some examples, a power supply of the keyless start system includes solar energy.

In a second aspect, the present application provides a riding mowing device including a frame, a cutting assembly, a walking assembly, a power supply assembly, and a keyless start system. The cutting assembly includes a deck and a mowing element at least partially accommodated in the deck. The walking assembly is used for driving the riding mowing device to walk. The power supply assembly is used for supplying power to at least the cutting assembly and the walking assembly and mounted to the frame.

The keyless start system includes a vehicle-to-everything device module, an authentication module, and a controller. The vehicle-to-everything device module is configured to receive a control instruction sent by a vehicle-to-everything server to the vehicle-to-everything device module. The authentication module is configured to authenticate the validity of the control instruction. The controller is electrically connected to at least the power supply assembly, where the controller controls the riding mowing device to switch from a locked mode to an unlocked mode after the validity authentication of the control instruction succeeds. In the locked mode, the controller prohibits the cutting assembly and/or the walking assembly from switching to a working state, and in the unlocked mode, the controller allows the cutting assembly and/or the walking assembly to switch to the working state.

In some examples, in the unlocked mode, the controller is capable of controlling the cutting assembly and/or the walking assembly to be in the working state or a braking state, where in the working state, the cutting assembly performs cutting work, and/or the walking assembly drives the riding mowing device to walk, and in the braking state, the cutting assembly does not perform the cutting work, and the walking assembly does not drive the riding mowing device to walk.

In some examples, in the locked mode, the controller prohibits the power supply assembly from supplying the power to the cutting assembly and/or the walking assembly, and in the unlocked mode, the controller allows the power supply assembly to supply the power to the cutting assembly and/or the walking assembly.

In some examples, the vehicle-to-everything server is configured to be capable of issuing the control instruction to the vehicle-to-everything device module based on a request message sent by a mobile terminal of a user.

In some examples, the mobile terminal is configured to be capable of sending the request message to the vehicle-to-everything server through an application (APP), where the request message includes identity information of the riding mowing device.

In some examples, the control instruction includes an authorization code and a start command. The authorization code is used by the authentication module to authenticate the validity of the control instruction, and the authorization code is configured to be generated by the vehicle-to-everything server based on the identity information of the riding mowing device. The start command is executed by the controller to control the riding mowing device to switch from the locked mode to the unlocked mode after the validity authentication of the control instruction succeeds.

In some examples, the riding mowing device further includes a display device capable of displaying a two-dimensional code corresponding to the identity information of the riding mowing device, and the two-dimensional code is configured such that the request message is capable of being generated after the two-dimensional code is scanned by the APP.

In some examples, the display device is a display screen capable of displaying the two-dimensional code.

In some examples, the display device is configured such that the fixed pattern of the two-dimensional code is imprinted on the surface of the display device.

In some examples, the authentication module is configured to compare the authorization code with the identity information of the riding mowing device, where when the authorization code matches the identity information of the riding mowing device, the validity authentication of the control instruction succeeds, and when the authorization code does not match the identity information of the riding mowing device, the validity authentication of the control instruction fails.

In a third aspect, the present application provides a riding mowing device including a frame, a cutting assembly, a walking assembly, a power supply assembly, and a keyless start system. The cutting assembly includes a deck and a mowing element at least partially accommodated in the deck. The walking assembly is used for driving the riding mowing device to walk. The power supply assembly is used for supplying power to at least the cutting assembly and the walking assembly and mounted to the frame.

The keyless start system includes a collection module, an authentication module, and a controller. The collection module is configured to collect at least one type of biometric information of a user. The authentication module is configured to authenticate the validity of the biometric information. The controller is electrically connected to at least the power supply assembly, where the controller controls the riding mowing device to switch from a locked mode to an unlocked mode after the validity authentication of the biometric information succeeds. In the locked mode, the controller prohibits the cutting assembly and/or the walking assembly from switching to a working state, and in the unlocked mode, the controller allows the cutting assembly and/or the walking assembly to switch to the working state.

In some examples, in the unlocked mode, the controller is capable of controlling the cutting assembly and/or the walking assembly to be in the working state or a braking state, where in the working state, the cutting assembly performs cutting work, and/or the walking assembly drives the riding mowing device to walk, and in the braking state, the cutting assembly does not perform the cutting work, and the walking assembly does not drive the riding mowing device to walk.

In some examples, in the locked mode, the controller prohibits the power supply assembly from supplying the power to the cutting assembly and/or the walking assembly, and in the unlocked mode, the controller allows the power supply assembly to supply the power to the cutting assembly and/or the walking assembly.

In some examples, the authentication module is configured to determine whether the biometric information is preset biometric information, where when the biometric information matches the preset biometric information, the validity authentication of the biometric information succeeds, and when the biometric information does not match the preset biometric information, the validity authentication of the biometric information fails.

In some examples, the preset biometric information is one or more of fingerprint information, iris information, or information about facial features.

In some examples, when one type of preset biometric information is provided, the authentication module is configured such that when the biometric information matches the preset biometric information, the validity authentication of the biometric information succeeds, and when the biometric information does not match the preset biometric information, the validity authentication of the biometric information fails.

In some examples, when multiple types of preset biometric information is provided, the authentication module is configured such that when at least one type of biometric information matches the preset biometric information, the validity authentication of the biometric information succeeds, and when any of the biometric information does not match the preset biometric information, the validity authentication of the biometric information fails.

In some examples, the riding mowing device further includes a collection apparatus for mounting the collection module.

In some examples, the collection apparatus is disposed on a seat.

In some examples, the riding mowing device further includes a steering wheel and a pedal. The steering wheel is operated by the user to control a walking direction of the riding mowing device. The pedal is operated by the user to control a walking speed of the riding mowing device. The collection apparatus is disposed on the steering wheel or the pedal.

In some examples, a power supply of the keyless start system includes the power supply assembly.

In some examples, a power supply of the keyless start system includes energy recovered by the riding mowing device when braking.

In some examples, a power supply of the keyless start system includes solar energy.

In a fourth aspect, the present application provides a riding mowing device including a frame, a cutting assembly, a walking assembly, a power supply assembly, and a keyless start system. The cutting assembly includes a deck and a mowing element at least partially accommodated in the deck. The walking assembly is used for driving the riding mowing device to walk. The power supply assembly is used for supplying power to at least the cutting assembly and the walking assembly and mounted to the frame.

The keyless start system includes a speech recognition module, an authentication module, and a controller. The speech recognition module is configured to collect and recognize a speech password uttered by a user. The authentication module is configured to authenticate the validity of the speech password. The controller is electrically connected to at least the power supply assembly, where the controller controls the riding mowing device to switch from a locked mode to an unlocked mode after the validity authentication of the speech password succeeds. In the locked mode, the controller prohibits the cutting assembly and/or the walking assembly from switching to a working state, and in the unlocked mode, the controller allows the cutting assembly and/or the walking assembly to switch to the working state.

In some examples, in the unlocked mode, the controller is capable of controlling the cutting assembly and/or the walking assembly to be in the working state or a braking state, where in the working state, the cutting assembly performs cutting work, and/or the walking assembly drives the riding mowing device to walk, and in the braking state, the cutting assembly does not perform the cutting work, and the walking assembly does not drive the riding mowing device to walk.

In some examples, in the locked mode, the controller prohibits the power supply assembly from supplying the power to the cutting assembly and/or the walking assembly, and in the unlocked mode, the controller allows the power supply assembly to supply the power to the cutting assembly and/or the walking assembly.

In some examples, the authentication module is configured such that when the speech password matches a preset password, the validity authentication of the speech password succeeds, and when the speech password does not match the preset password, the validity authentication of the speech password fails.

In some examples, the controller is further configured to set a usage right of the preset password, where the usage right includes the preset number of times the preset password is used and/or a preset valid duration of the preset password.

In some examples, the speech recognition module is capable of generating a speech instruction based on the speech password. The controller is capable of controlling the power supply assembly, the walking assembly, and the cutting assembly according to the speech instruction.

In some examples, when the speech recognition module recognizes the speech password as a speech instruction to control the power supply assembly to start or stop, the controller is capable of controlling, according to the speech instruction, the power supply assembly to start or stop.

In some examples, when the speech recognition module recognizes the speech password as a speech instruction to control the walking assembly to start, stop, or adjust a speed, the controller is capable of controlling, according to the speech instruction, the walking assembly to start, stop, or adjust the speed.

In some examples, when the speech recognition module recognizes the speech password as a speech instruction to control the cutting assembly to start or stop, the controller is capable of controlling, according to the speech instruction, the cutting assembly to start or stop.

In some examples, a power supply of the keyless start system includes the power supply assembly.

In some examples, a power supply of the keyless start system includes energy recovered by the riding mowing device when braking.

In some examples, a power supply of the keyless start system includes solar energy.

The riding mowing device provided by the present application includes the keyless start system which allows the user to start the riding mowing device without a key. The keyless start system can control the riding mowing device to switch from the locked mode to the unlocked mode. In the locked mode, the riding mowing device cannot walk or perform a mowing function, and in the unlocked mode, the riding mowing device can walk and perform the mowing function. The smart unlocking and locking of the riding mowing device are implemented by the keyless start system so that better user experience is provided.

DETAILED DESCRIPTION

Figure 1:
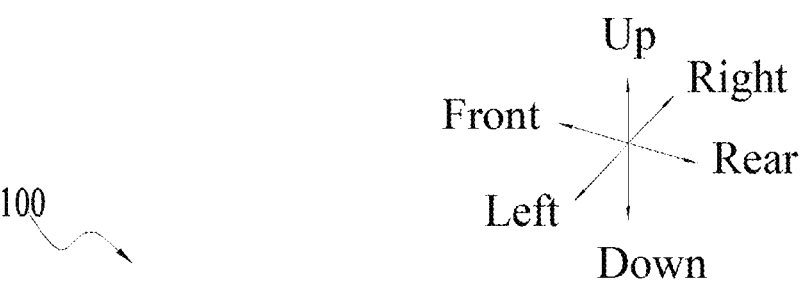
FIG. 1 is a perspective view of a riding mowing device in an example of the present application.
Figure 1:
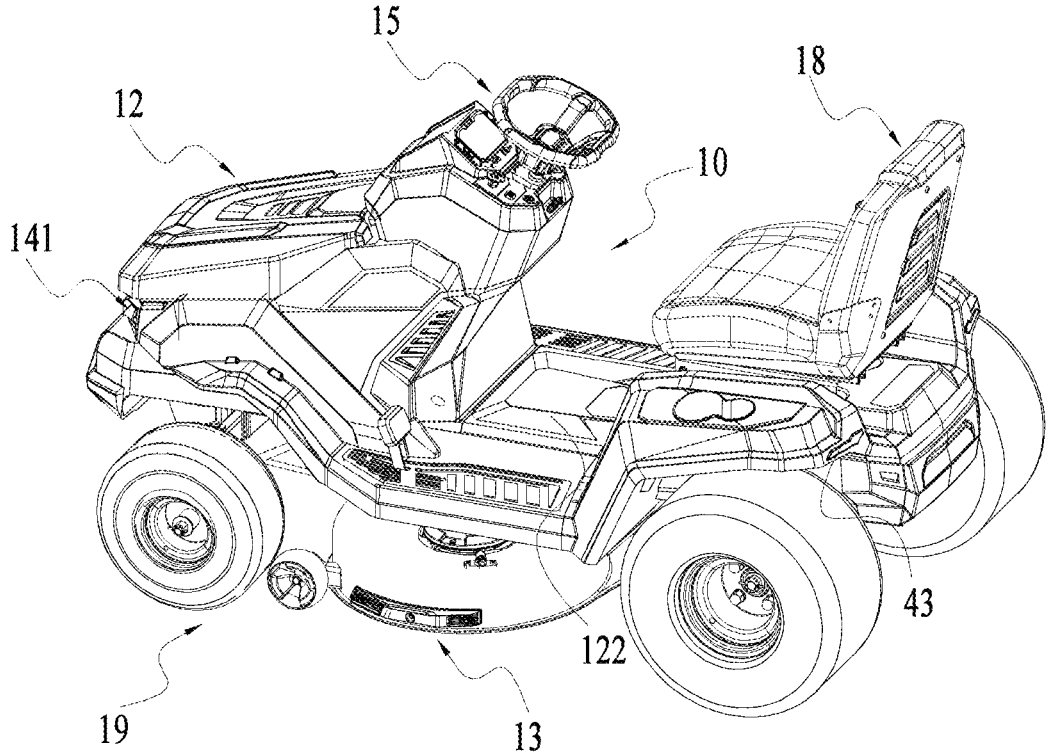
Figure 2:
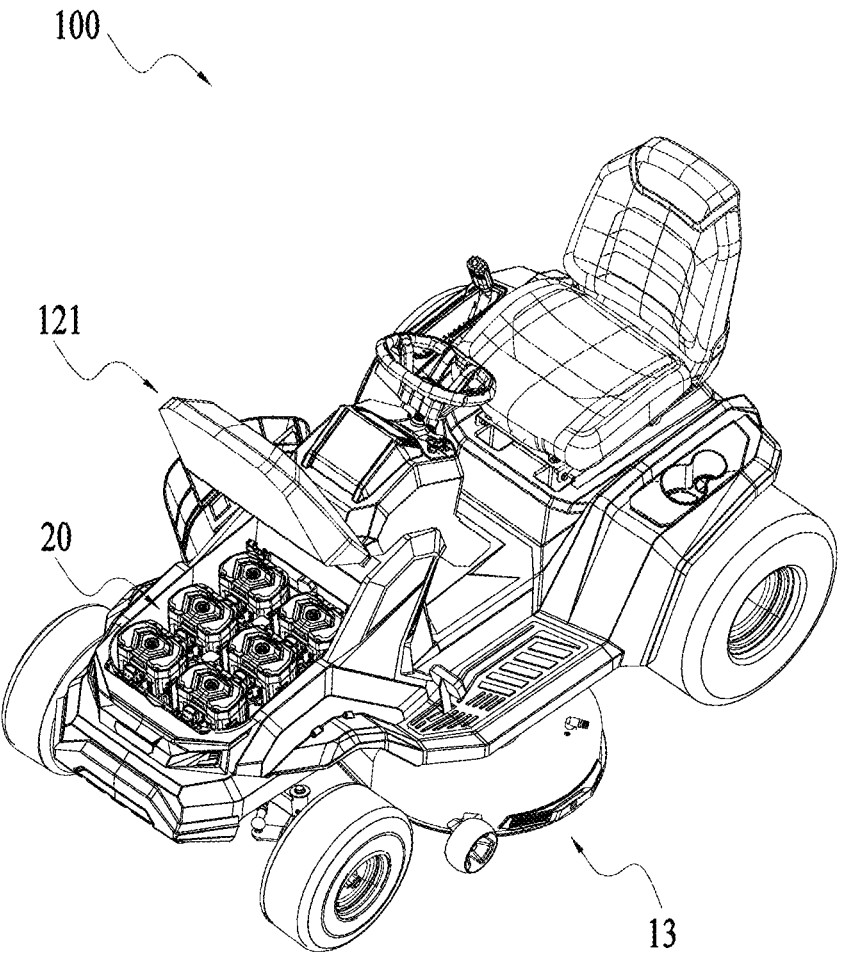
FIG. 2 is a perspective view of the riding mowing device in FIG. 1 with a front cover open.
Figure 3:
FIG. 3 is a perspective view of a partial structure of the riding mowing device in FIG. 1.
Figure 3:
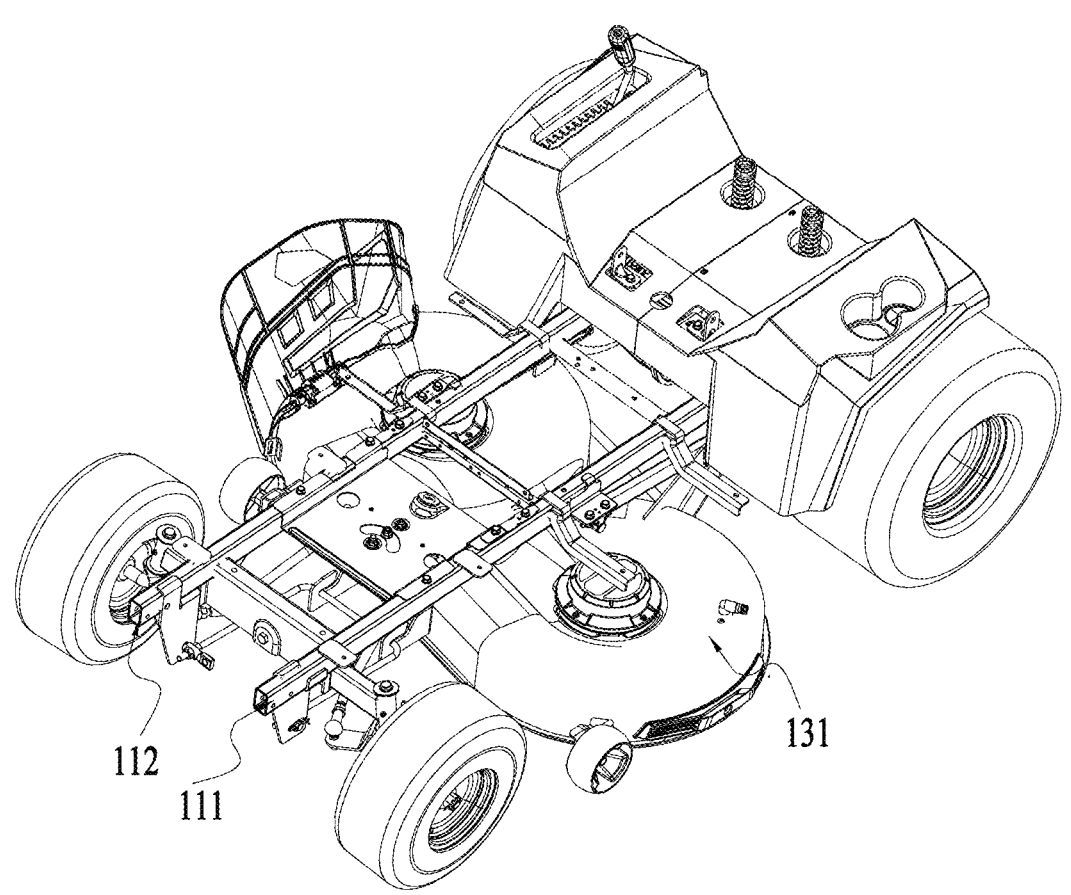
Figure 4:
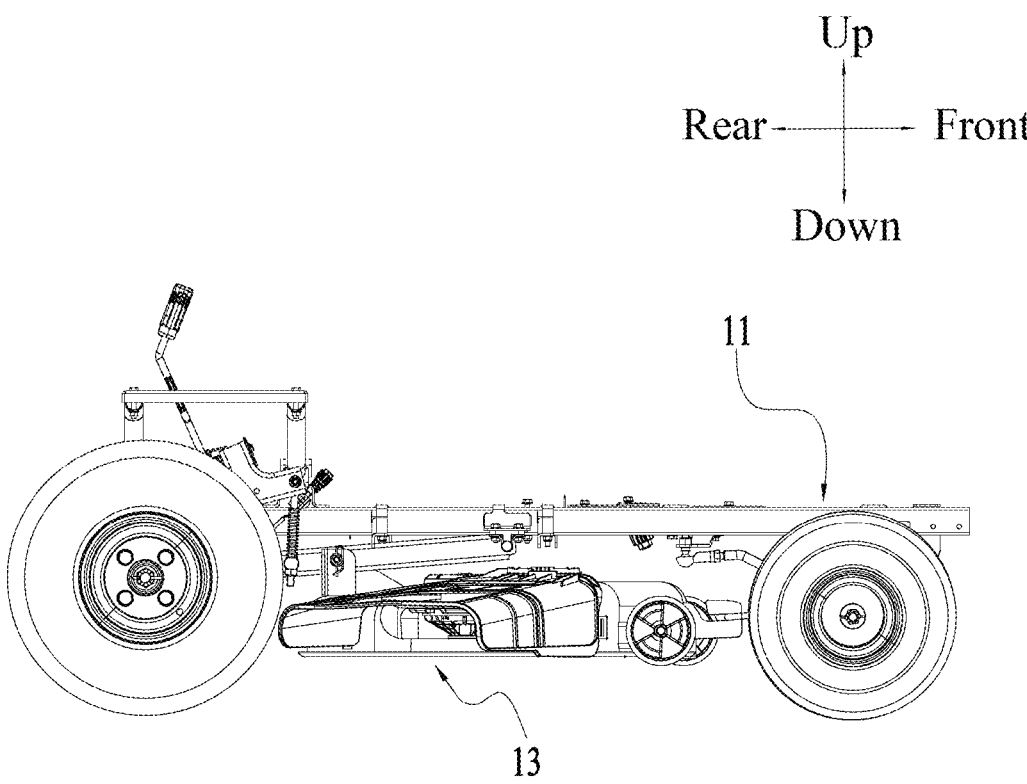
FIG. 4 is a side view of a partial structure of the riding mowing device in FIG. 1.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance.

In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

A riding mowing device disclosed in the present application may be a riding mower. A user may sit on the riding mowing device to operate it to trim a lawn, other vegetation, and the like.

In this specification, front, rear, left, right, up, and down are described as directions shown in FIG. 1. Specifically, when the user sits on a riding mowing device 100 on the ground, it is defined that the direction which the user faces is front, the direction which the user faces away from is rear, the direction on the left-hand side of the user is left, the direction on the right-hand side of the user is right, the direction towards the ground is down, and the direction away from the ground is up.

As shown in FIGS. 1 to 5, the riding mowing device 100 includes a frame 11, a housing system 12, a cutting assembly 13, a lighting system 14, an operation assembly 15, a seat 18, a walking assembly 19, and a power supply assembly 20. The frame 11 and the housing system 12 constitute a main body 10 of the riding mowing device 100, the main body 10 is used for mounting the cutting assembly 13, the seat 18, the power supply assembly 20, and the lighting system 14, and the walking assembly 19 is used for supporting the main body 10. The seat 18 is mounted to the frame 11, the user sits on the seat 18, and the frame 11 carries the seat 18.

The riding mowing device 100 supplies energy to the cutting assembly 13, the walking assembly 19, the lighting system 14, and the like through a power assembly. In this example, the power assembly of the riding mowing device 100 is the power supply assembly 20, and the power supply assembly 20 supplies electrical energy to each assembly of the riding mowing device 100 so that the riding mowing device 100 may be used as a power tool. The electric riding mowing device 100 is more environmentally friendly and more energy-efficient than a fuel-based riding mowing device 100.

Figure 5:
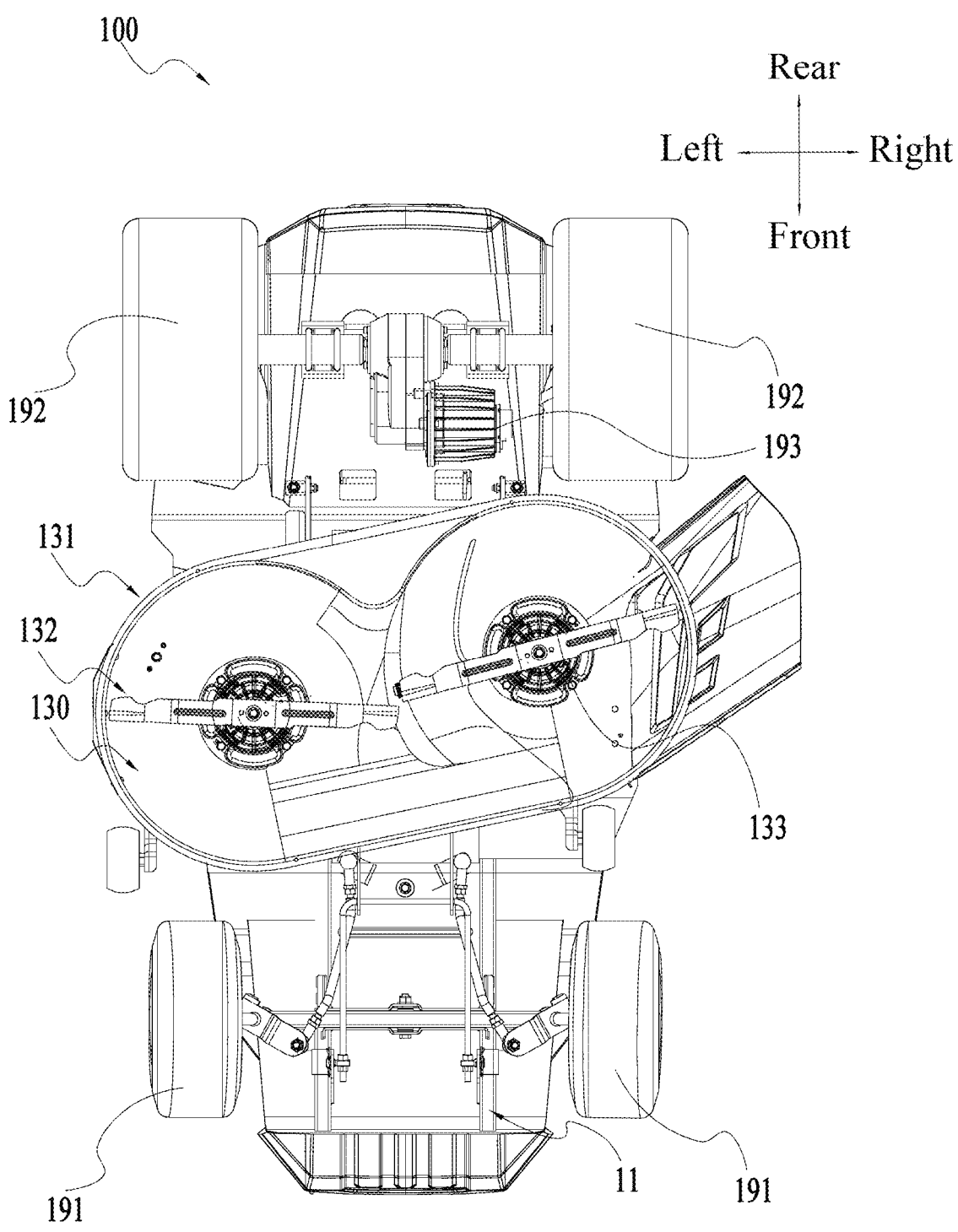
FIG. 5 is a bottom view of the riding mowing device in FIG. 1.

The cutting assembly 13 is used for outputting power to implement a function of the riding mowing device 100. The cutting assembly 10 is used as a power output member supported by the main body 10. As shown in FIG. 5, the cutting assembly 13 includes a deck 131, mowing elements 132, and first motors 133. A mowing element 132 is used for cutting the vegetation when rotating at a high speed. For example, the mowing element 132 is a blade for cutting grass on the lawn. The deck 131 surrounds a mowing space 130 for accommodating at least part of the mowing elements 132, that is to say, the mowing elements 132 are at least partially accommodated in the deck 131. A first motor 133 is used for driving the mowing element 132 to rotate. The cutting assembly 13 is disposed below the frame 11. In an example, two mowing elements 132 may be provided, two first motors 133 may be provided, and correspondingly, the two first motors 133 drive the two mowing elements 132 separately. In an example, three mowing elements 132 may be provided, three first motors 133 may be provided, and correspondingly, the three first motors 133 drive the three mowing elements 132 separately. The mowing elements 132 are disposed in the mowing space 130 surrounded by the deck 131. The mowing space 130 is open downward so that the mowing elements 132 can cut the vegetation located below the mowing space 130.

Figure 6:
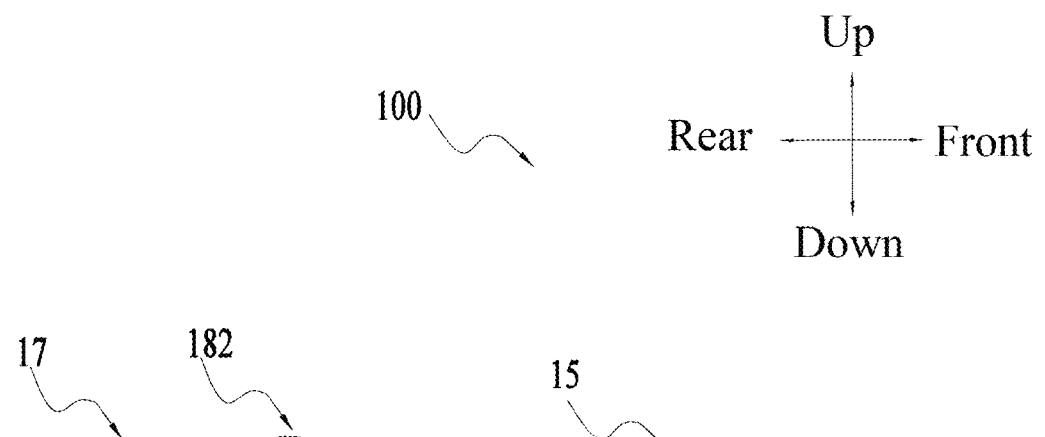
FIG. 6 is a side view of the riding mowing device in FIG. 1 with a grass collection system mounted.
Figure 6:
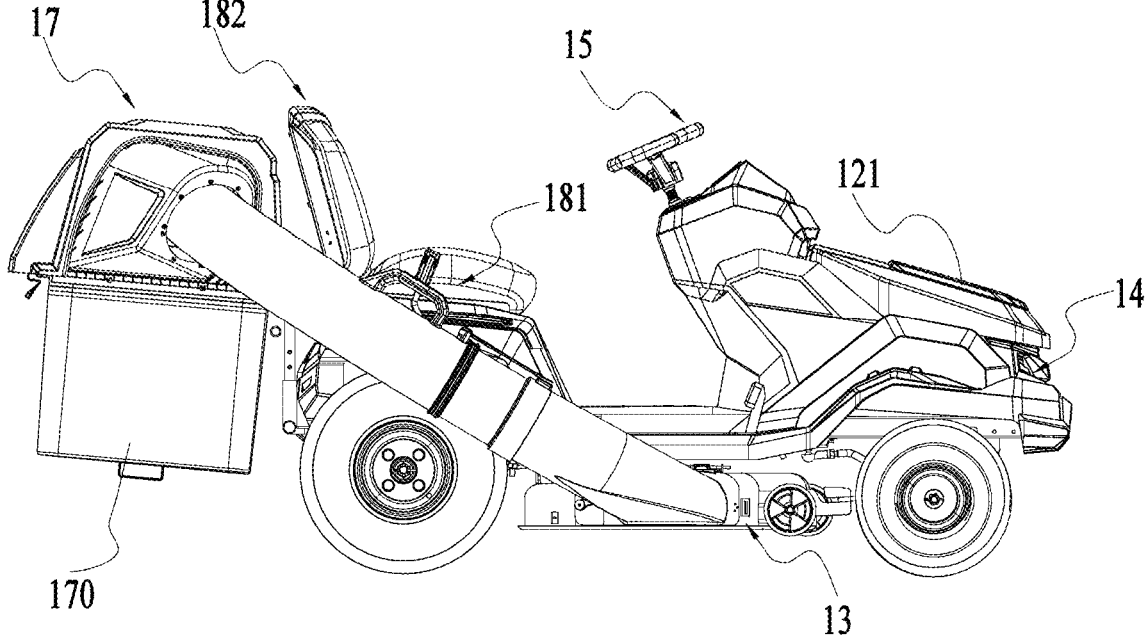

As shown in FIG. 6, the riding mowing device 100 may further include a grass collection system 17 for collecting grass clippings cut by the cutting assembly 13. The grass collection system 17 includes a grass collection basket assembly 170 detachably mounted behind the seat 18. The seat 18 includes a cushion 181 and a backrest 182, where the user sits on the cushion 181, and the backrest 182 is used for supporting the back of the user. Therefore, in other words, the grass collection basket assembly 170 is mounted behind the backrest 182.

Figure 7:
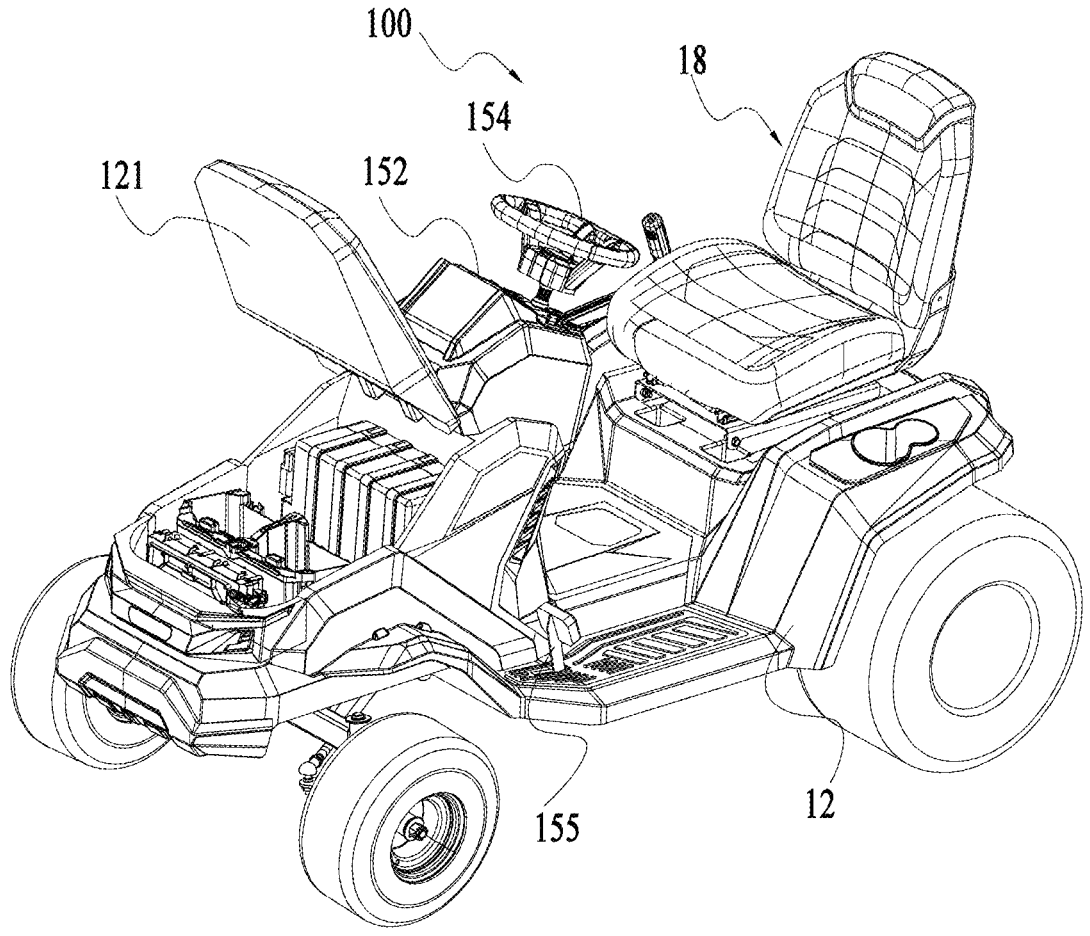
FIG. 7 is a perspective view of a riding mowing device with a front cover open in an example of the present application.

Referring to FIG. 7, the cutting assembly 13 is detachable from the riding mowing device. In this case, another working attachment is connectable to the riding mowing device, for example, a snow removing assembly. The snow removing assembly includes a snow shovel and an apparatus for adjusting the angle of the snow shovel, and the snow removing assembly is attachable to the frame 11. In this case, strictly speaking, the riding mowing device is no longer just a riding mowing device, but a riding vehicle. The riding vehicle may perform different work according to different working attachments connected thereto. In an example, the riding mowing device 100 is provided with at least one working attachment interface, such as a hook, threads, a hole, or a groove. Due to the strong load-bearing capacity of the frame 11, at least one working attachment interface may be formed on or fixed to the frame 11.

Different working attachment interfaces are used for matching different working attachments, and the same working attachment interface may match different working attachments.

The frame 11 extends basically along a front and rear direction. The cutting assembly 13, the housing system 12, the walking assembly 19, the power supply assembly 20, the grass collection system 17, and the lighting system 14 are all mounted to the frame 11. The frame 11 is used for supporting the main body 10 of the entire riding mowing device 100. The walking assembly 19 is used for supporting the frame 11 so that the riding mowing device 100 can walk on the ground, and the walking assembly 19 includes a first walking assembly 191 and a second walking assembly 192. In this example, the first walking assembly 191 is a front walking assembly including two first walking wheels. The second walking assembly 192 is a rear walking assembly including two second walking wheels. In an example, a differential is further included, where when the riding mowing device 100 turns or travels on an uneven road surface, the differential enables a left second walking wheel and a right second walking wheel driven by a second motor 193 to rotate at different speeds.

In an example, the lighting system 14 includes a front lighting assembly 141, a left lighting assembly 142, and a right lighting assembly 143. The front lighting assembly 141 may light up the region in front of the riding mowing device 100. The left lighting assembly 142 and the right lighting assembly 143 may be used as position lights of the riding mowing device 100 so that it is convenient for other people around to observe the outline of the riding mowing device 100.

The power supply assembly 20 is used for powering the cutting assembly 13, the walking assembly 19, the lighting system 14, and the like, where the first motor 133, the second motor 193, and the lighting system 14, as powered devices included in the riding mowing device 100, can convert the electrical energy into other forms of energy.

Figure 8:
FIG. 8 is a perspective view of an operation assembly of a riding mowing device in an example of the present application.
Figure 8:
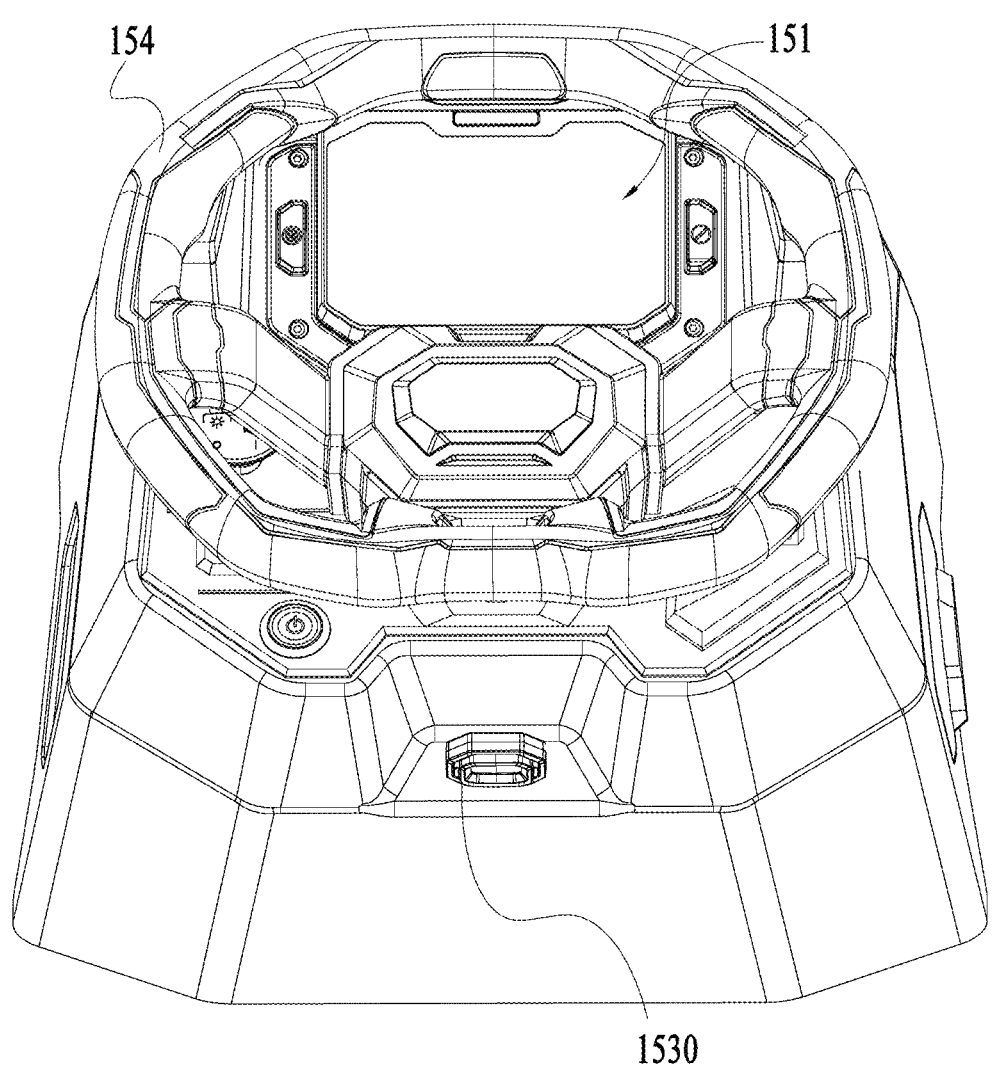
Figure 9:
FIG. 9 is a perspective view of an operation assembly of a riding mowing device in an example of the present application.

Referring to FIGS. 7 to 9, the operation assembly 15 of the riding mowing device 100 includes a control panel 152, a steering wheel 154, and pedals 155. The pedals 155 include an accelerator pedal and a brake pedal. The control panel 152 and the steering wheel 154 are disposed between the seat 18 and a front cover 121. In this example, the steering wheel 154 may be operated by the user to control the traveling direction of the riding mowing device 100. The control panel 152 is connected to the front cover 121. The control panel 152 may include a display screen 151 so that the user can conveniently see a display state on the display screen 151 while operating multiple operation members 153, which is more in line with the ergonomic design. The display screen 151 is used for displaying the state information of the riding mowing device 100. The multiple operation members 153 may be operated by the user to control the walking assembly and the cutting assembly. The multiple operation members 153 may include switches, buttons, gears, and the like. The multiple operation members 153 may be configured to have different shapes and sizes so that the user may operate different operation members 153 without looking at the operation members 153.

As shown in FIGS. 8 and 9, in some examples, the multiple operation members 153 include a keyhole 1530. The riding mowing device 100 may be started when a mechanical key 1531 is inserted into the keyhole 1530. In an example, when the mechanical key 1531 is inserted into the keyhole 1530, the switch in the keyhole 1530 can be turned on. That is to say, the mechanical key 1531 is inserted into the keyhole 1530 and it is unnecessary to rotate the mechanical key 1531 such that the switch in the keyhole 1530 can be turned on, thereby facilitating the operation of the user. In an example, a safety cover is also connected at the keyhole 1530. The safety cover is movably connected to the keyhole 1530. When a key 551 is not inserted into the keyhole 1530, the keyhole 1530 is closed by the safety cover so that moisture, dust, and the like are prevented from entering the keyhole 1530. When the key 551 is inserted into the keyhole 1530, the safety cover is pressed down so that the keyhole 1530 is open. The keyhole 1530 is formed at the control panel 152, and the safety cover may be rotatably connected to the control panel 152 by a torsion spring. The multiple operation members 153 further include a start button. When the start button is triggered, the riding mowing device 100 enters a standby state. In this case, the user may operate another operation member 153 to cause the riding mowing device 100 to enter a walking state, a mowing state, or the like. The multiple operation members 153 further include a cruise control button. When the cruise control button is triggered, the riding mowing device 100 receives a cruise control instruction sent by the user and determines, according to a current state, whether to enter a cruise control mode. In an example, the multiple operation pieces 153 are distributed below the display screen 151 from the perspective of the user.

As shown in FIG. 9, the display screen 151 includes a display interface 1510 for displaying the working state of the riding mowing device 100. The display interface 1510 is understood as a display region directly observed by the user. Different state information may be displayed on the display interface 1510 as needed. The traveling speed of the walking assembly 19, the rotational speed of the mowing element 132, the energy efficiency state of the riding mowing device 100, the remaining power information of the power supply assembly 20, warning information, fault information, and the remaining running time of the power supply assembly 20 may be displayed on the display interface 1510. The display screen 151 further includes multiple buttons arranged around the display interface 1510, for example, a first button 1511 and a second button 1512 operated by the user to adjust the traveling speed of the riding mowing device 100 and the rotational speed of a blade of the riding mowing device 100, respectively. In an example, the first button 1511 may be operated by the user to change the maximum traveling speed of the riding mowing device 100. When the user steps on a pedal 155 to the maximum position, the riding mowing device 100 walks at the maximum traveling speed set by the first button 1511. The second button 1512 may be operated by the user to change the rotational speed of the mowing element of the riding mowing device 100. The first button 1511 and the second button 1512 may be disposed on the left side of the display interface 1510 and the right side of the display interface 1510, respectively. Further, a third button 1513 is disposed around the display interface 1510 and is operated by the user to control the lighting function of the riding mowing device 100. For example, when the user operates the third button 1513 in a first operation manner, part of the lights are turned on by the lighting system 40; and when the user operates the third button 1513 in a second operation manner, all the lights are turned on by the lighting system 40. In this example, further, a fourth button 1514 is disposed around the display interface 1510. The fourth button 1514 may be operated by the user so that the riding mowing device 100 enters different driving modes, such as a sport mode, a normal mode, and a control mode. In this manner, the user can select different driving modes according to personal preferences, thereby improving the user experience of the riding mowing device 100. The state information on the display interface 1510 can be conveniently viewed by the user, and the size of the display interface 510 is understood as the size of a display region which is exposed to be observable by the user.

Figure 10:
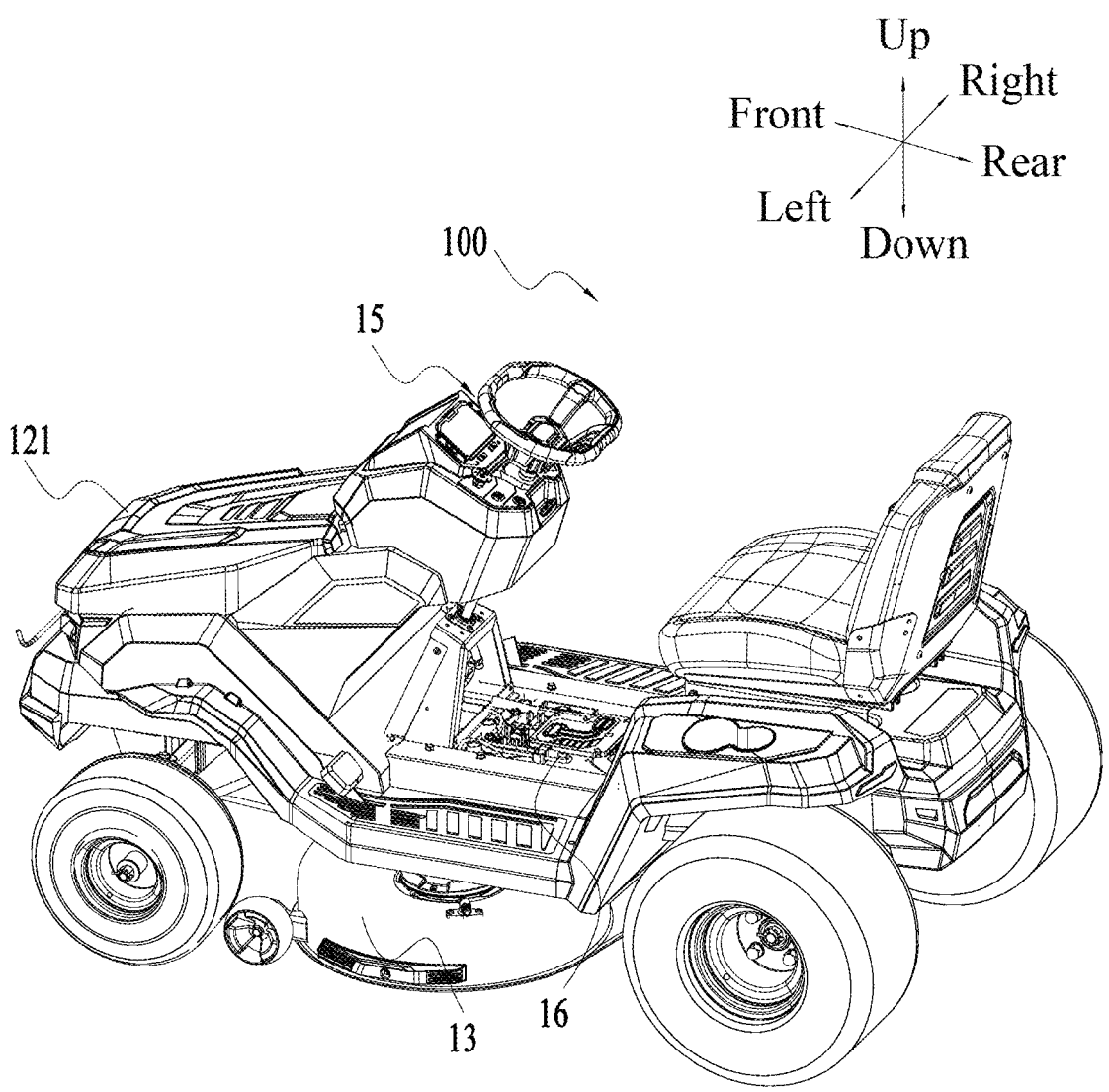
FIG. 10 is a perspective view of the riding mowing device in FIG. 1 with a maintenance cover removed.

Referring to FIG. 10, the riding mowing device 100 further includes a circuit board assembly 16 including a signal circuit board, a control circuit board and a display circuit board. The circuit board assembly 16 is mounted to the frame 11. In the front and rear direction, the circuit board assembly 16 is disposed between the seat 18 and the power supply assembly 20, and further, the circuit board assembly 16 is disposed between the seat 18 and a support rod. In an example, the circuit board assembly 16 is disposed at a position below a maintenance cover 122 of the riding mowing device 100, that is, the position stepped on by the user when sitting on the seat 18. In the up and down direction, the circuit board assembly 16 is disposed between the maintenance cover 122 and the deck 131. Such a layout can save space, facilitate wiring, and make the structure of the whole machine more compact, which is conducive to the heat dissipation and later maintenance of the circuit board assembly 16.

In some examples, the riding mowing device 100 provided by the present application may be started through not only the key inserted into the keyhole but also a keyless start system so that the user is allowed to start the riding mowing device without the key. In other examples, the riding mowing device 100 may not include the keyhole and only allows the user to start the riding mowing device through the keyless start system.

The present application provides a keyless start system 30 which allows the user to start the riding mowing device 100 without the key.

Figure 11:
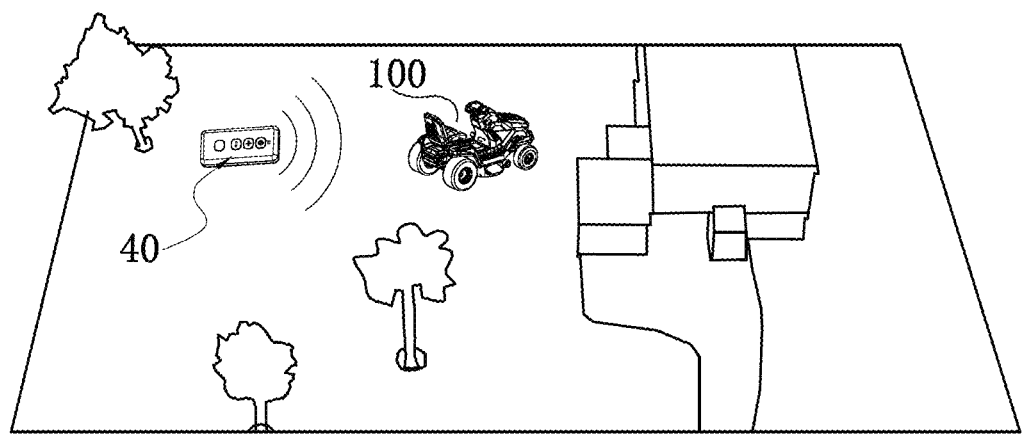
FIG. 11 is a perspective view of a riding mowing device and a smart key in an example of the present application.
Figure 12:
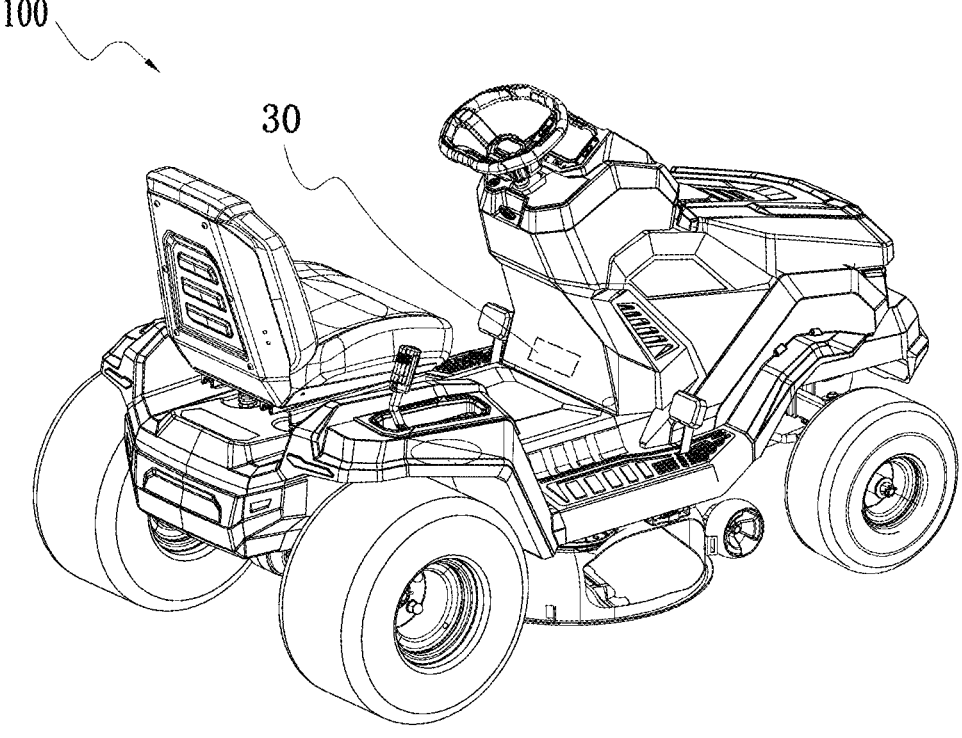
FIG. 12 is a perspective view of a riding mowing device with a keyless start system installed in an example of the present application.

As shown in FIGS. 11 and 12, in some examples, the keyless start system 30 is configured to cooperate with the user's smart key 40 to start the riding mowing device 100. In some examples, as shown in FIG. 12, the keyless start system 30 may be mounted above the maintenance cover 122 of the riding mowing device 100. In other examples, the keyless start system 30 and the circuit board assembly 16 shown in FIG. 10 may be together disposed below the maintenance cover 122 of the riding mowing device 100 for later replacement and maintenance.

The smart key 40 in the present application may be any portable device with the function of communicating with the riding mowing device 100, for example, a mobile phone, a laptop, a smartwatch, a smart bracelet, an electronic key, an NFC card, and smart running shoes.

Figure 13:
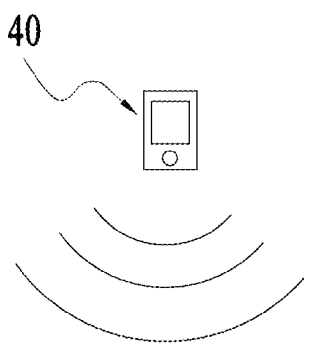
FIG. 13 is a schematic block diagram of a keyless start system in an example of the present application.
Figure 13:
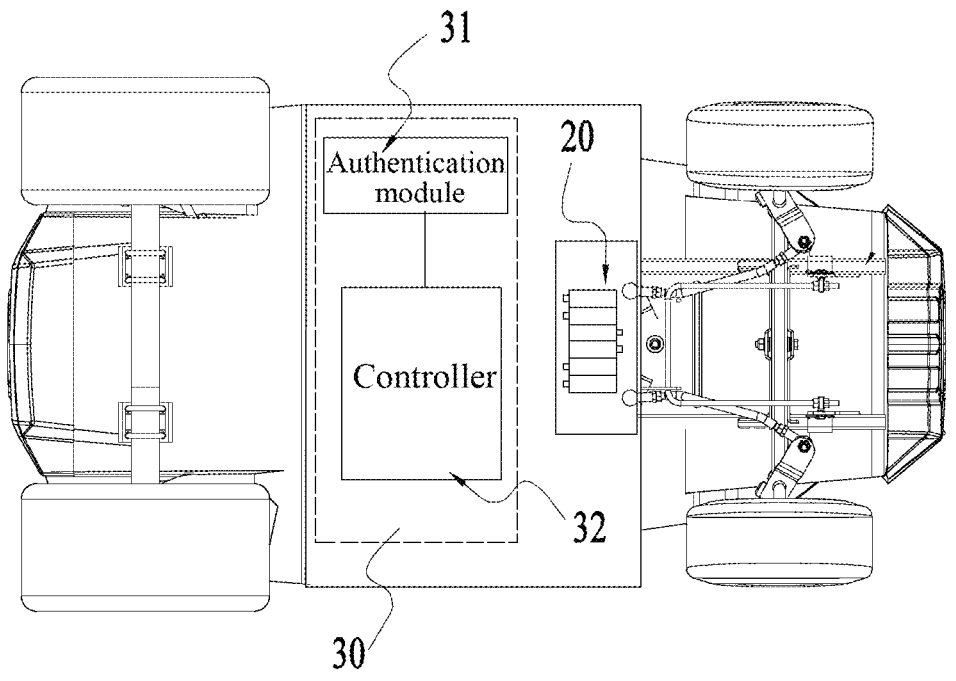

As shown in FIG. 13, in some examples, the keyless start system 30 includes at least an authentication module 31 and a controller 32. The authentication module 31 is configured to authenticate the validity of the user's smart key 40. The controller 32 is electrically connected to at least the power supply assembly 20, where the controller 32 controls the riding mowing device 100 to switch from a locked mode to an unlocked mode after the validity authentication of the smart key 40 succeeds. In the locked mode, the controller 32 prohibits the cutting assembly 13 and/or the walking assembly 19 from switching to a working state, and the riding mowing device 100 cannot walk or perform a cutting function. In the unlocked mode, the controller 32 allows the cutting assembly 13 and/or the walking assembly 19 to switch to the working state, and the riding mowing device 100 can walk and perform the cutting function.

Specifically, in some examples, when the keyless start system 30 receives a request instruction of the smart key 40, the keyless start system 30 may verify the smart key 40 and send a verification request to the smart key 40. The verification request includes a random code automatically generated by the keyless start system 30 through a random number generator. When the smart key 40 receives the random code, the smart key 40 confirms, according to the verification request, a security algorithm corresponding to a keyless entry mode, calculates the random code through the security algorithm to obtain a calculation result, encrypts the calculation result to generate encrypted data, and sends the encrypted data to the keyless start system 30. The keyless start system 30 matches the received calculation result with a calculation result calculated by the keyless start system 30. When the matching succeeds, the authentication succeeds.

In some examples, in the unlocked mode, the controller 32 can control the cutting assembly 13 and/or the walking assembly 19 to be in the working state or a braking state. In the working state, the cutting assembly 13 performs cutting work, and/or the walking assembly 19 drives the riding mowing device 100 to walk. In the braking state, the cutting assembly 13 does not perform the cutting work, and the walking assembly 19 does not drive the riding mowing device 100 to walk. In the braking state, the cutting assembly 13 does not perform the cutting work but is in the state of being capable of performing the cutting work at any time according to the operation of the user, and the walking assembly 19 does not drive the riding mowing device 100 to walk but is in the state of being capable of driving, at any time according to the operation of the user, the riding mowing device 100 to walk. That is to say, in the unlocked mode, the controller 32 can control, according to the operation of the user, the cutting assembly 13 and/or the walking assembly 19 to switch between the working state and the braking state.

In some examples, in the locked mode, the controller 32 prohibits the power supply assembly 20 from supplying power to the cutting assembly 13 and/or the walking assembly 19. In the unlocked mode, the controller 32 allows the power supply assembly 20 to supply the power to the cutting assembly 13 and/or the walking assembly 19.

In other examples, each of the first motor 133 driving the cutting assembly 13 and/or the second motor 193 driving the walking assembly 19 may be a brushless motor, and the brushless motor may not rotate in an energized state. In the locked mode of this example, the controller 32 may allow the power supply assembly 20 to supply the power to the cutting assembly 13 and/or the walking assembly 19, and the first motor 133 and the second motor 193 are in the energized state but cannot drive the cutting assembly 13 and the walking assembly 19 to work. In the unlocked mode of this example, the controller 32 controls the first motor 133 and the second motor 193 to be in the energized state and be capable of driving the cutting assembly 13 and the walking assembly 19 to work.

The user expects not only that the riding mowing device has the functions of keyless start and smart identification of the on/off state but also that the mowing device has a variety of protection functions including an alarm for an unauthorized intrusion.

In some examples, after the validity authentication of the smart key 40 fails multiple times, the riding mowing device 100 sends an alarm signal. Specifically, the controller 30 may control the lighting system 14 to flash and use the flash as the alarm signal.

In some examples, after the validity authentication of the smart key 40 fails multiple times, within a preset time, the controller 30 controls the riding mowing device 100 to be in the locked mode so as to prevent another person from trying multiple times to start the riding mowing device 100.

According to the preceding technical solution, the smart unlocking and locking of the riding mowing device 100 are implemented, and the riding mowing device 100 also has an anti-theft function, thereby improving the safety of the riding mowing device 100.

In some examples, the riding mowing device 100 can be controlled to switch from the locked mode to the unlocked mode after the smart key 40 of the user establishes a communication connection to the keyless start system 30. In a practical application, the user's smart key 40 and the keyless start system 30 may establish the communication connection through any one of the following wireless communication modules: a Bluetooth Low Energy (BLE) module, a Bluetooth module, a Wi-Fi module, a Zigbee module, an ultra-wideband (UWB) module, an NFC module, and the like.

Optionally, the smart key 40 is a digital key using Bluetooth or NFC as a communication medium. Alternatively, the smart key 40 is a low-frequency key using an electromagnetic wave of 125 kHz or 434 kHz as a communication medium. Alternatively, the smart key 40 is a mobile terminal of the user, where the mobile terminal establishes the communication connection to the keyless start system 30 through Wi-Fi, NFC, or Bluetooth.

Figure 14:
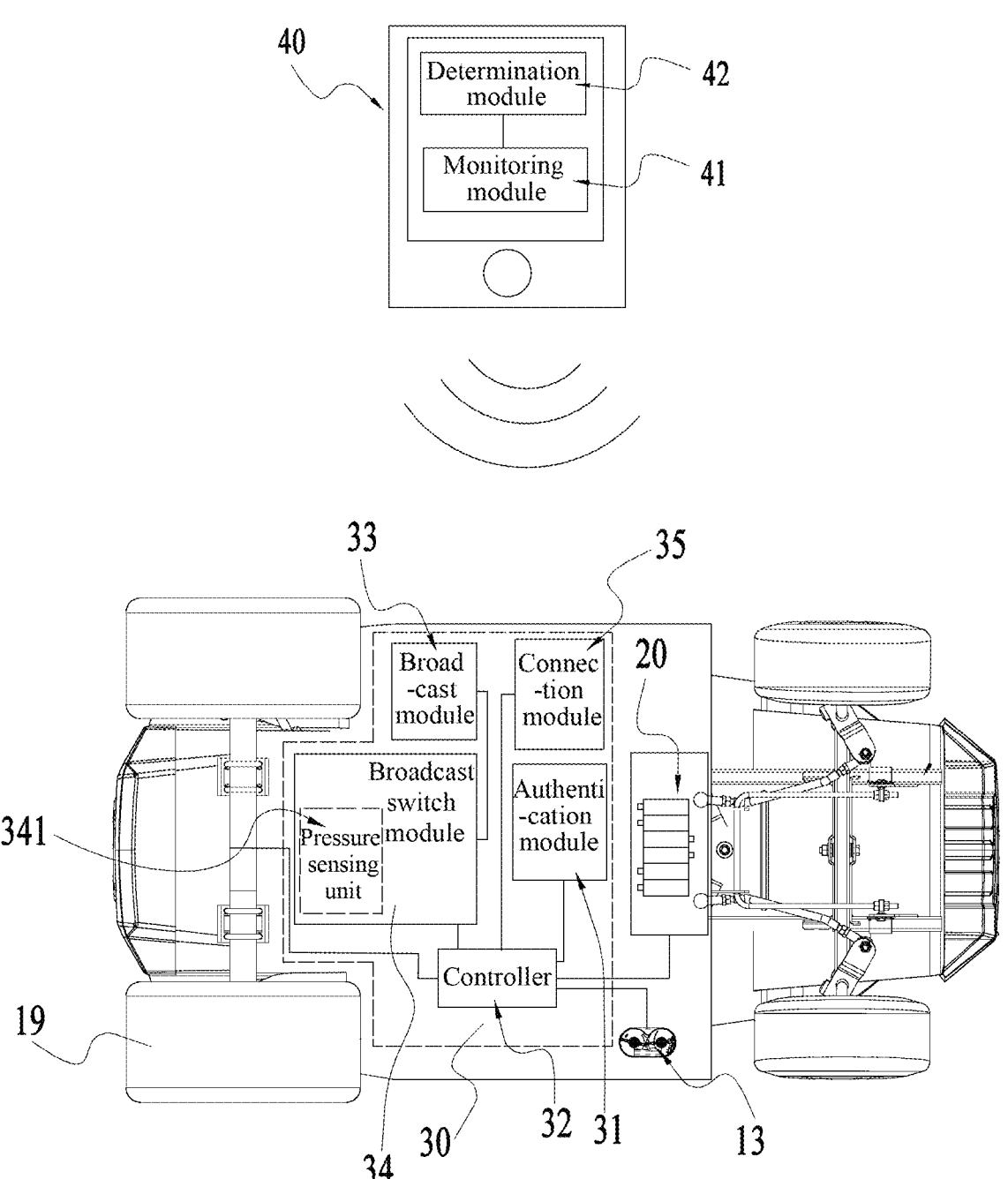
FIG. 14 is a schematic block diagram of a keyless start system and a smart key in an example of the present application.

As shown in FIG. 14, in some examples, the keyless start system 30 further includes a broadcast module 33 capable of broadcasting a predetermined signal. The keyless start system 30 is configured to: authenticate, through the authentication module 31, the validity of a smart key 40 entering a radiation region of the predetermined signal; and control, through the controller 32, the riding mowing device 100 to switch from the locked mode to the unlocked mode after the validity authentication of the smart key 40 succeeds.

In some examples, the keyless start system 30 further includes a broadcast switch module 34 configured to enable and disable the broadcast module. The broadcast switch module 34 is configured to, when the riding mowing device 100 is in the unlocked mode, control the broadcast module 33 to stop broadcasting the predetermined signal.

In some examples, a wireless communication module may be disposed in the broadcast module 33 so that the broadcast module 33 has the capability of broadcasting a specific signal (the predetermined signal) when the riding mowing device 100 is in the locked mode. When the riding mowing device 100 is in the locked mode, the broadcast module 33 may broadcast the predetermined signal in real time or at a certain frequency, for example, every 0.5 s or 1 s. In order that the electric quantity of the riding mowing device 100 is saved, it is preferable to broadcast the predetermined signal at a certain frequency. The broadcast frequency may be flexibly set according to actual application conditions. The signal broadcast by the broadcast module 33 only needs to be within a certain regional range. Therefore, the broadcast module 33 may be configured to have a relatively small volume and does not occupy too much interior space of the riding mowing device 100.

In some examples, the broadcast switch module 34 includes a pressure sensing unit 341 mounted to the seat 18, and the broadcast switch module 34 is configured to, when the riding mowing device 100 is in the locked mode and the pressure sensing unit 341 detects that the seat 18 bears pressure, control the broadcast module 33 to begin broadcasting the predetermined signal.

In some examples, the smart key 40 includes a monitoring module 41 and a determination module 42. The monitoring module 41 is configured to monitor the predetermined signal, where the predetermined signal is a signal broadcast by the riding mowing device 100 in the radiation region. The determination module 42 is configured to, when the predetermined signal is monitored by the monitoring module 41, determine that the smart key 40 enters the radiation region, where the smart key 40 entering the radiation region is used by the riding mowing device 100 to control, based on a result of the validity authentication of the smart key 40, the riding mowing device 100 to switch from the locked mode to the unlocked mode.

Figure 15:
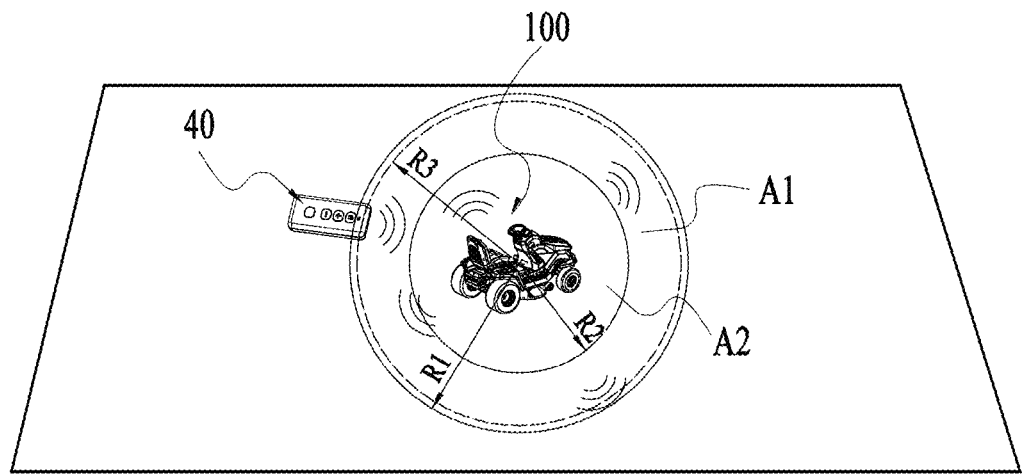
FIG. 15 is a schematic diagram showing a radiation region of a riding mowing device in an example of the present application.

As shown in FIG. 15, in some examples, the radiation region includes a first region A1 and a second region A2, where a radial distance R1 of the first region A1 relative to the riding mowing device 100 is greater than a radial distance R2 of the second region A2 relative to the riding mowing device 100. The keyless start system 30 further includes a connection module 35 configured to be connected to the smart key 40, where the connection module 35 is pre-connected or connected to the smart key 40 in the first region A1. The authentication module 31 performs identity verification on the smart key in the second region A2.

In some examples, the connection module 35 is configured to, when the smart key 40 enters the radiation region whose radial distance relative to the riding mowing device 100 is within a radial distance R3, be pre-connected or connected to the smart key 40. The authentication module 31 is configured to, when the smart key 40 enters the radiation region whose radial distance relative to the riding mowing device 100 is within the radial distance R3 and after the connection module 35 is pre-connected or connected to the smart key 40, performs the identity verification on the smart key 40. The predetermined radial distance R3 is less than or equal to the radial distance R1 of the radiation region.

Considering that the radiation range of the predetermined signal is a region, it takes a certain amount of time for the user carrying the smart key 40 to enter the radiation region and approach the riding mowing device. In the optional example, the radiation range of the predetermined signal is divided into at least two regions: the first region A1 and the second region A2, so that the case is avoided where an unscrupulous person who approaches the riding mowing device before the user pre-empts the riding mowing device maliciously because the riding mowing device 100 is unlocked before the user approaches the riding mowing device 100, that is, the riding mowing device 100 is unlocked too early. The radial distances of the two regions relative to the riding mowing device 100 are different from each other. Colloquially, the radial distance R1 of the first region A1 relative to the riding mowing device 100 is relatively large and the first region A1 is relatively far from the riding mowing device 100, and the radial distance R2 of the second region A2 relative to the riding mowing device is relatively small and the second region A2 is relatively close to the riding mowing device. The smart key 40 enters the first region A1 and then enters the second region A2 until the smart key 40 approaches the riding mowing device 100, which refers to the trajectory of the smart key 40. When the smart key 40 enters the first region A1, the keyless start system 30 is connected to the smart key 40.

When the smart key 40 enters the second region A2, the identity verification is performed on the smart key 40. It is to be understood that according to this optional solution, the radiation region is divided into the two different regions with the different distances from the riding mowing device 100, the connection is performed in the region far from the riding mowing device 100, and the identity verification is performed in the region close to the riding mowing device 100 so that it can be ensured that the riding mowing device 100 is automatically unlocked when the user approaches and is relatively close to the riding mowing device 100, which is a solution that the riding mowing device is unlocked through the approach. Thus, the problem can be avoided that the unscrupulous person pre-empts the riding mowing device 100 maliciously because the riding mowing device 100 is unlocked too early.

In some examples, the authentication module 31 is configured to acquire information about the smart key from the smart key 40, perform the validity authentication according to the information about the smart key, encrypt the information about the smart key through a preset algorithm to generate encrypted data, and check whether user information corresponding to the encrypted data exists in a preset mapping table. If the corresponding user information exists in the preset mapping table, the validity authentication of the smart key 40 succeeds, and if the corresponding user information does not exist in the preset mapping table, the validity authentication of the smart key 40 fails.

Figure 16:
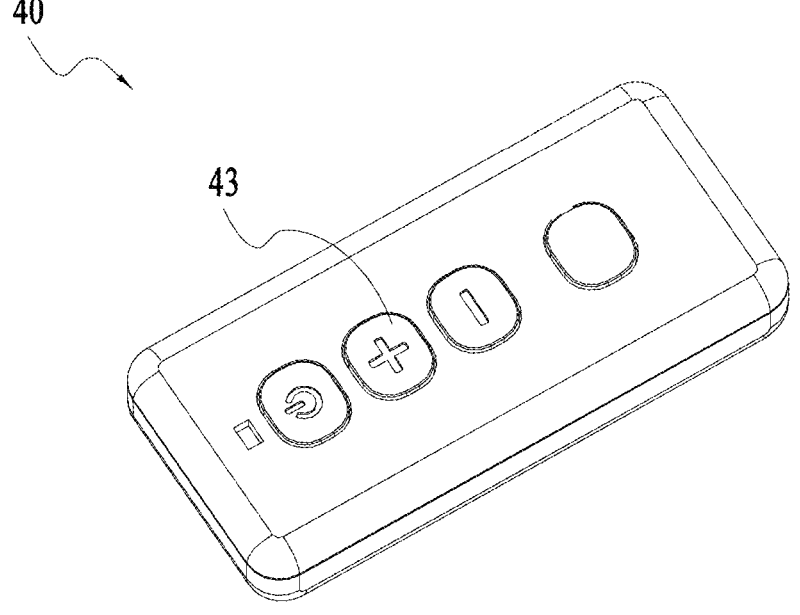
FIG. 16 is a perspective view of a smart key in an example of the present application.

As shown in FIG. 16, in some examples, the smart key 40 includes an operation button 43, where the operation button 43 is capable of transmitting a remote control signal to the keyless start system so as to control the riding mowing device to work. In an example, the operation button 43 may be a physical button or a touch button. The operation button 43 may be made of silica gel and integrally designed so that a good dustproof effect is achieved.

The operation button 43 may include a remote control button for matching, a remote control power button, and a remote control button for adjusting a speed. The remote control button for matching is used for outputting a connection signal to the riding mowing device 100 to establish a connection relationship between a remote control and the riding mowing device 100 so that the two can perform data interaction. Optionally, the remote control button for matching may also be used for outputting a remote control signal for lighting, and after the riding mowing device 100 receives the remote control signal for lighting, the controller 32 turns on or off the lighting system 14. The remote control power button is used for outputting a remote control signal for controlling the power supply assembly 20, the walking assembly 19, or the cutting assembly 13 to start or brake and stop to the riding mowing device 100. After the riding mowing device 100 receives a remote control signal for a start or a remote control signal for a shutdown, the controller 32 controls the power supply assembly 20, the walking assembly 19, or the cutting assembly 13 to start or brake and stop.

The remote control button for adjusting the speed is used for outputting a remote control signal for controlling the walking assembly 19 or the cutting assembly 13 to increase or decrease the speed to the riding mowing device 100. After the controller or a tool body 10 receives the signal for increasing the speed or the signal for decreasing the speed, the controller 32 controls the walking assembly 19 or the cutting assembly 13 to start or brake and stop. In other examples, the remote control signal may also include an information signal for acquiring a working condition of the tool body.

In some scenarios, when the user loses or forgets to carry the key or the smart key, the user cannot normally use the vehicle.

In this example, the riding mowing device 100 has a keyless start mode and a mode in which the start is performed through the mechanical key. When the riding mowing device 100 is in the keyless start mode, the riding mowing device 100 may work through the keyless start system 30. That is, the keyless start system 30 is valid in this case, the authentication module 31 can authenticate the validity of the user's smart key 40, and the controller 32 controls the riding mowing device 100 to switch from the locked mode to the unlocked mode after the validity authentication of the smart key 40 succeeds. When the riding mowing device 100 is in the mode in which the start is performed through the mechanical key, the riding mowing device 100 cannot work through the keyless start system 30. That is, the keyless start system 30 is invalid in this case, and the authentication module 31 cannot receive the signal of the smart key 40. When the mechanical key 1531 is inserted into the keyhole, the riding mowing device 100 is switched from the keyless start mode to the mode in which the start is performed through the mechanical key. That is to say, the process where the mechanical key 1531 is inserted into the keyhole 1530 may make the keyless start system 30 invalid. When the riding mowing device 100 is in the mode in which the start is performed through the mechanical key, the riding mowing device 100 can be started by the mechanical key 1531.

Figure 17:
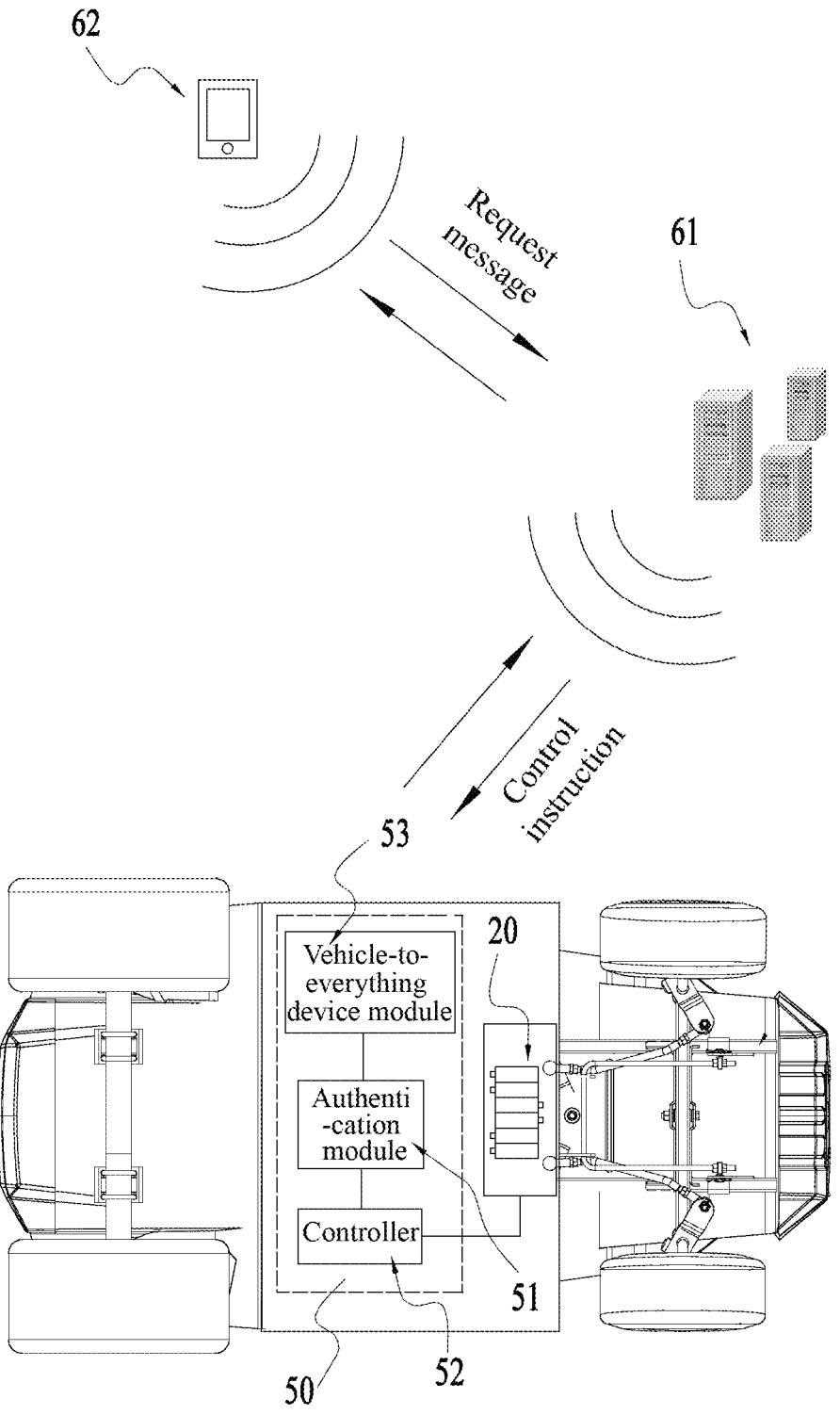
FIG. 17 is a schematic diagram showing that a keyless start system works with a mobile terminal and a vehicle-to-everything server in an example of the present application.

As shown in FIG. 17, the present application provides another keyless start system 50 which allows the user to start the riding mowing device 100 through cloud communication.

The keyless start system 50 includes a vehicle-to-everything device module 53, an authentication module 51, and a controller 52. The vehicle-to-everything device module 53 is configured to receive a control instruction sent by a vehicle-to-everything server 61 to the vehicle-to-everything device module 53. The authentication module 51 is configured to authenticate the validity of the control instruction. The controller 52 is electrically connected to at least the power supply assembly, where the controller 52 controls the riding mowing device 100 to switch from the locked mode to the unlocked mode after the validity authentication of the control instruction succeeds. In the locked mode, the controller 52 prohibits the cutting assembly 13 and/or the walking assembly 19 from switching to the working state, and the riding mowing device 100 cannot walk or perform the cutting function. In the unlocked mode, the controller 52 allows the cutting assembly 13 and/or the walking assembly 19 to switch to the working state, and the riding mowing device 100 can walk and perform the cutting function.

In some examples, in the unlocked mode, the controller 52 can control the cutting assembly 13 and/or the walking assembly 19 to be in the working state or the braking state. In the working state, the cutting assembly 13 performs the cutting work, and/or the walking assembly 19 drives the riding mowing device 100 to walk. In the braking state, the cutting assembly 13 does not perform the cutting work, and the walking assembly 19 does not drive the riding mowing device 100 to walk. In the braking state, the cutting assembly 13 does not perform the cutting work but is in the state of being capable of performing the cutting work at any time according to the operation of the user, and the walking assembly 19 does not drive the riding mowing device 100 to walk but is in the state of being capable of driving, at any time according to the operation of the user, the riding mowing device 100 to walk. That is to say, in the unlocked mode, the controller 52 can control, according to the operation of the user, the cutting assembly 13 and/or the walking assembly 19 to switch between the working state and the braking state.

In some examples, in the locked mode, the controller 52 prohibits the power supply assembly 20 from supplying the power to the cutting assembly 13 and/or the walking assembly 19. In the unlocked mode, the controller 52 allows the power supply assembly 20 to supply the power to the cutting assembly 13 and/or the walking assembly 19.

In other examples, each of the first motor 133 driving the cutting assembly 13 and/or the second motor 193 driving the walking assembly 19 may be the brushless motor, and the brushless motor may not rotate in the energized state. In the locked mode of this example, the controller 52 may allow the power supply assembly 20 to supply the power to the cutting assembly 13 and/or the walking assembly 19, and the first motor 133 and the second motor 193 are in the energized state but cannot drive the cutting assembly 13 and the walking assembly 19 to work. In the unlocked mode of this example, the controller 52 controls the first motor 133 and the second motor 193 to be in the energized state and be capable of driving the cutting assembly 13 and the walking assembly 19 to work.

In some examples, the mobile terminal 62 is configured to be capable of sending the request message to the vehicle-to-everything server 61 through an APP, where the request message includes identity information of the riding mowing device 100.

Specifically, the mobile terminal 62 may be the mobile phone, tablet computer, smart bracelet, or the like of the user. The user may bind the mobile terminal 62 to the vehicle-to-everything device module 53 through Bluetooth pairing or website registration. After the binding is completed, when the user forgets to carry the mechanical key or the smart key, the user only needs to send the request message to the vehicle-to-everything server 61 through the mobile terminal 62. After the vehicle-to-everything server 61 receives the request message, the vehicle-to-everything server 61 parses the request message and sends a control instruction to the vehicle-to-everything device module 53. After determining the identity of the mobile terminal 62, the vehicle-to-everything device module 53 controls the riding mowing device 100 to switch from the locked mode to the unlocked mode. Thus, the keyless start system 50 of the present application provides a new method for the user to start the riding mowing device 100 without the key. With this method, the user can also safely access and start the riding mowing device 100 without carrying the mechanical key, the smart key, or a remote control key, thereby improving the convenience of use by the user.

In some examples, the control instruction includes an authorization code and a start command. The authorization code is used by the authentication module 51 to authenticate the validity of the control instruction, and the authorization code is configured to be generated by the vehicle-to-everything server 61 based on the identity information of the riding mowing device 100. The start command is executed by the controller 52 to control the riding mowing device 100 to switch from the locked mode to the unlocked mode after the validity authentication of the control instruction succeeds.

In some examples, the riding mowing device 100 further includes a display device capable of displaying a two-dimensional code uniquely corresponding to the identity information of the riding mowing device 100, and the two-dimensional code is configured such that the request message is capable of being generated after the two-dimensional code is scanned by the APP.

In some examples, the display device is a display screen 151 capable of displaying the two-dimensional code. In an example, the riding mowing device 100 has the two-dimensional code uniquely corresponding to the identity information of the riding mowing device 100 at the time of delivery, and the display screen 151 may display the two-dimensional code.

In some examples, the display device is configured such that the fixed pattern of the two-dimensional code is imprinted on the surface of the display device. In an example, the riding mowing device 100 has the two-dimensional code uniquely corresponding to the identity information of the riding mowing device 100 at the time of delivery, and the two-dimensional code may be imprinted on the surface of the body of the riding mowing device 100. For example, the two-dimensional code may be imprinted on the surface of the control panel 152.

In some examples, the authentication module 51 is configured to compare the authorization code with the identity information of the riding mowing device 100, where when the authorization code matches the identity information of the riding mowing device 100, the validity authentication of the control instruction succeeds, and when the authorization code does not match the identity information of the riding mowing device 100, the validity authentication of the control instruction fails.

In other examples, the present application also provides a riding mowing device 100 which is unlocked through a verification code. All the parts of the preceding example which are compatible with this example are applicable to this example. For convenience of description, only the difference between this example and the preceding example is described below. The vehicle-to-everything server 61 may send the authorization code to the vehicle-to-everything device module 53 based on the request message and send a verification code to the APP. The keyless entry and start system 50 may further include an information input module configured to receive the verification code inputted by the user. The authentication module 51 is configured to compare the verification code inputted by the user with the authorization code received by the vehicle-to-everything device module 53. When the verification code inputted by the user matches the authorization code received by the vehicle-to-everything device module 53, the validity authentication of the control instruction succeeds. When the verification code inputted by the user does not match the authorization code received by the vehicle-to-everything device module 53, the validity authentication of the control instruction fails. Specifically, the display device of the riding mowing device can be used by the user to input the verification code.

In some scenarios, when the user loses or forgets to carry the mobile terminal and the key, the user cannot normally use the vehicle and cannot use the mobile terminal to unlock the riding mowing device.

Figure 18:
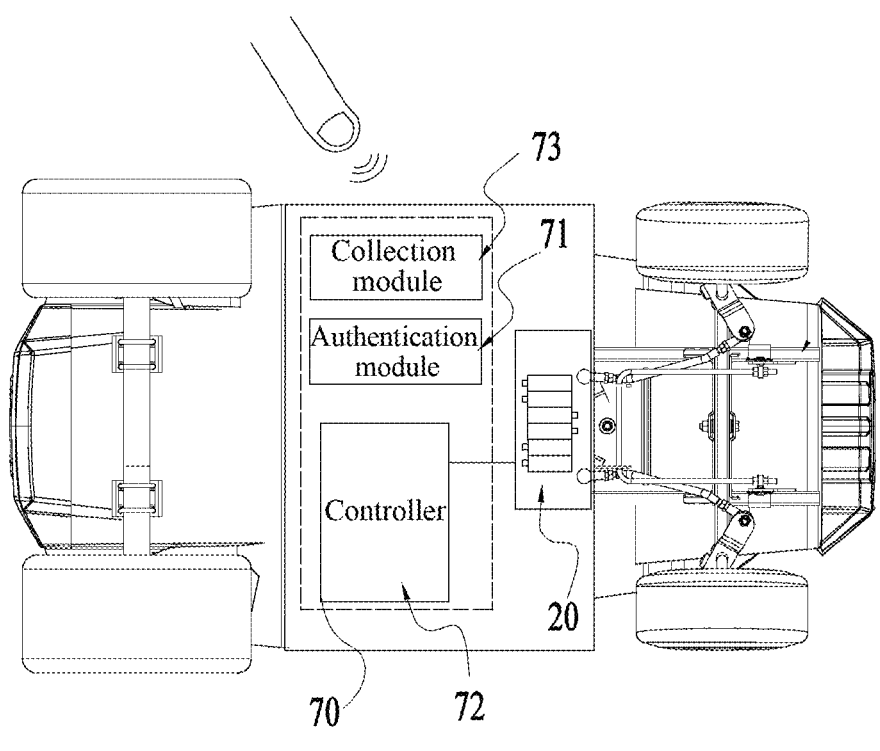
FIG. 18 is a schematic block diagram of a keyless start system capable of collecting biometric information of a user in an example of the present application.

As shown in FIG. 18, the present application provides a keyless start system 70 which can allow the user to unlock the riding mowing device 100 through biometric information, thereby improving the convenience of use by the user. The biometric information of the user may be one or more of the fingerprint information, iris information, or information about facial features of the user.

The keyless start system 70 includes a collection module 73, an authentication module 71, and a controller 72. The collection module 73 is configured to collect at least one type of biometric information of the user. The authentication module 71 is configured to authenticate the validity of the biometric information. The controller 72 is electrically connected to at least the power supply assembly 20, where the controller 72 controls the riding mowing device 100 to switch from the locked mode to the unlocked mode after the validity authentication of the biometric information succeeds.

In the locked mode, the controller 72 prohibits the cutting assembly 13 and/or the walking assembly 19 from switching to the working state, and the riding mowing device 100 cannot walk or perform the cutting function. In the unlocked mode, the controller 72 allows the cutting assembly 13 and/or the walking assembly 19 to switch to the working state, and the riding mowing device 100 can walk and perform the cutting function.

In some examples, in the unlocked mode, the controller 72 can control the cutting assembly 13 and/or the walking assembly 19 to be in the working state or the braking state. In the working state, the cutting assembly 13 performs the cutting work, and/or the walking assembly 19 drives the riding mowing device 100 to walk. In the braking state, the cutting assembly 13 does not perform the cutting work, and the walking assembly 19 does not drive the riding mowing device 100 to walk. In the braking state, the cutting assembly 13 does not perform the cutting work but is in the state of being capable of performing the cutting work at any time according to the operation of the user, and the walking assembly 19 does not drive the riding mowing device 100 to walk but is in the state of being capable of driving, at any time according to the operation of the user, the riding mowing device 100 to walk. That is to say, in the unlocked mode, the controller 72 can control, according to the operation of the user, the cutting assembly 13 and/or the walking assembly 19 to switch between the working state and the braking state.

In some examples, in the locked mode, the controller 72 prohibits the power supply assembly 20 from supplying the power to the cutting assembly 13 and/or the walking assembly 19. In the unlocked mode, the controller 72 allows the power supply assembly 20 to supply the power to the cutting assembly 13 and/or the walking assembly 19.

In other examples, each of the first motor 133 driving the cutting assembly 13 and/or the second motor 193 driving the walking assembly 19 may be the brushless motor, and the brushless motor may not rotate in the energized state. In the locked mode of this example, the controller 72 may allow the power supply assembly 20 to supply the power to the cutting assembly 13 and/or the walking assembly 19, and the first motor 133 and the second motor 193 are in the energized state but cannot drive the cutting assembly 13 and the walking assembly 19 to work. In the unlocked mode of this example, the controller 72 controls the first motor 133 and the second motor 193 to be in the energized state and be capable of driving the cutting assembly 13 and the walking assembly 19 to work.

In some examples, the authentication module 71 is configured to determine whether the biometric information is preset biometric information, where when the biometric information matches the preset biometric information, the validity authentication of the biometric information succeeds, and when the biometric information does not match the preset biometric information, the validity authentication of the biometric information fails.

One or more types of preset biometric information may be preset by the user. In an example, the preset biometric information may be one or more of the fingerprint information, the iris information, or the information about the facial features.

In some examples, when one type of preset biometric information is provided, the authentication module 71 is configured such that when the biometric information matches the preset biometric information, the validity authentication of the biometric information succeeds, and when the biometric information does not match the preset biometric information, the validity authentication of the biometric information fails. For example, the user may use his/her own fingerprint information as the preset biometric information. When it is determined by the authentication module 71 that the fingerprint information collected by the collection module 73 matches the preset biometric information, the validity authentication of the biometric information can succeed, and the controller 72 controls the riding mowing device 100 to switch from the locked mode to the unlocked mode.

In some scenarios, it is difficult to recognize some type of biometric information of the user because the user may have a physiological change. For example, when a hand of the user is injured or swollen, it may be difficult for the authentication module 71 to successfully recognize the fingerprint of the user. In some examples, the user may set a variety of preset biometric information. In this case, the authentication module 71 is configured such that when at least one type of biometric information matches the preset biometric information, the validity authentication of the biometric information succeeds, and when any of the biometric information does not match the preset biometric information, the validity authentication of the biometric information fails. For example, the user may use his/her own fingerprint information and iris information as the preset biometric information in advance. When the finger of the user is injured, the fingerprint information of the user does not match the preset biometric information, but the iris information of the user matches the preset biometric information, the validity authentication of the biometric information succeeds, and the controller 72 controls the riding mowing device 100 to switch from the locked mode to the unlocked mode.

In some examples, the riding mowing device 100 further includes a collection apparatus 74 for mounting the collection module. In an example, the collection apparatus 74 is disposed on the seat 18. In some examples, the riding mowing device 100 further includes the steering wheel 154 and the pedal 155. The steering wheel 154 is operated by the user to control a walking direction of the riding mowing device 100. The pedal 155 is operated by the user to control a walking speed of the riding mowing device 100. The collection apparatus 74 is disposed on the steering wheel 154 or the pedal 155.

Figure 19:
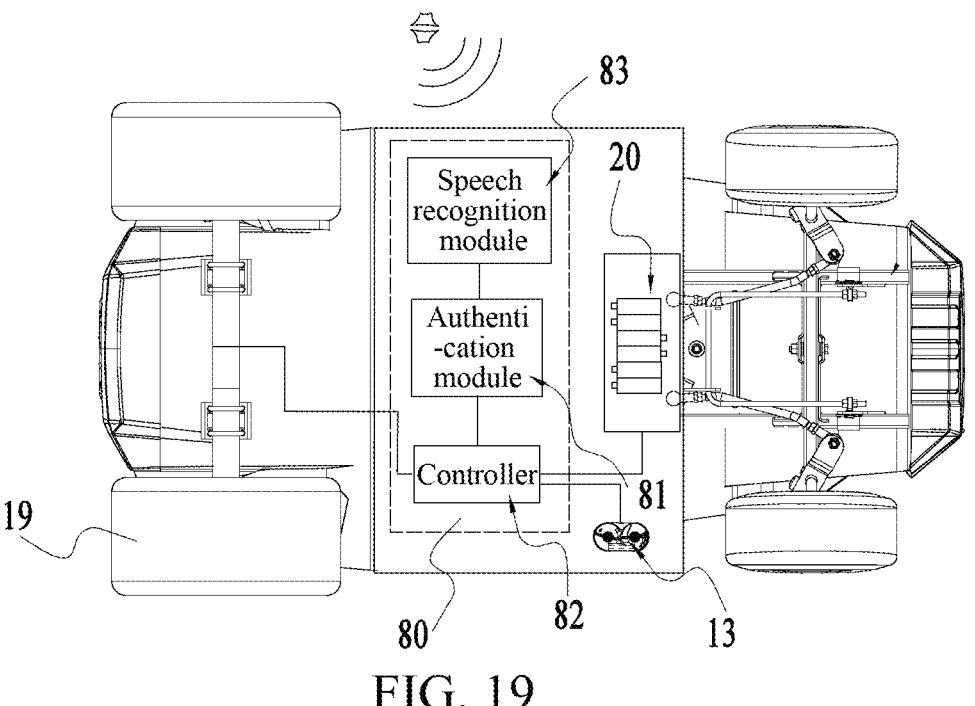
FIG. 19 is a schematic block diagram of a keyless start system capable of collecting speech information of a user in an example of the present application.

In some scenarios, the collection apparatus capable of recognizing the biometric information about the iris or fingerprint of the user has a high cost. As shown in FIG. 19, the present application provides a keyless start system 80 which can allow the user to unlock the riding mowing device 100 through speech information. Thus, the convenience of use by the user is improved, and the cost can be reduced.

The keyless start system 80 includes a speech recognition module 83, an authentication module 81, and a controller 82. The speech recognition module 83 is configured to collect and recognize a speech password uttered by the user. The authentication module 81 is configured to authenticate the validity of the speech password. The controller 82 is electrically connected to at least the power supply assembly, where the controller 82 controls the riding mowing device 100 to switch from the locked mode to the unlocked mode after the validity authentication of the speech password succeeds.

In the locked mode, the controller 82 prohibits the cutting assembly 13 and/or the walking assembly 19 from switching to the working state, and the riding mowing device 100 cannot walk or perform the cutting function. In the unlocked mode, the controller 82 allows the cutting assembly 13 and/or the walking assembly 19 to switch to the working state, and the riding mowing device 100 can walk and perform the cutting function.

In some examples, in the unlocked mode, the controller 82 can control the cutting assembly 13 and/or the walking assembly 19 to be in the working state or the braking state. In the working state, the cutting assembly 13 performs the cutting work, and/or the walking assembly 19 drives the riding mowing device 100 to walk. In the braking state, the cutting assembly 13 does not perform the cutting work, and the walking assembly 19 does not drive the riding mowing device 100 to walk. In the braking state, the cutting assembly 13 does not perform the cutting work but is in the state of being capable of performing the cutting work at any time according to the operation of the user, and the walking assembly 19 does not drive the riding mowing device 100 to walk but is in the state of being capable of driving, at any time according to the operation of the user, the riding mowing device 100 to walk. That is to say, in the unlocked mode, the controller 82 can control, according to the operation of the user, the cutting assembly 13 and/or the walking assembly 19 to switch between the working state and the braking state.

In some examples, in the locked mode, the controller 82 prohibits the power supply assembly 20 from supplying the power to the cutting assembly 13 and/or the walking assembly 19. In the unlocked mode, the controller 82 allows the power supply assembly 20 to supply the power to the cutting assembly 13 and/or the walking assembly 19.

In other examples, each of the first motor 133 driving the cutting assembly 13 and/or the second motor 193 driving the walking assembly 19 may be the brushless motor, and the brushless motor may not rotate in the energized state. In the locked mode of this example, the controller 82 may allow the power supply assembly 20 to supply the power to the cutting assembly 13 and/or the walking assembly 19, and the first motor 133 and the second motor 193 are in the energized state but cannot drive the cutting assembly 13 and the walking assembly 19 to work. In the unlocked mode of this example, the controller 82 controls the first motor 133 and the second motor 193 to be in the energized state and be capable of driving the cutting assembly 13 and the walking assembly 19 to work.

In some examples, the authentication module 81 is configured such that when the speech password matches a preset password, the validity authentication of the speech password succeeds, and when the speech password does not match the preset password, the validity authentication of the speech password fails. For example, the user may set "please begin to start the mower" as the preset password. When the speech password of the user is "start the mower" or "begin to start", the authentication module 81 determines that the speech password does not match the preset password, and the validity authentication of the speech password fails. Only when the speech password of the user is also "please begin to start the mower", the authentication module 81 determines that the speech password matches the preset password, the validity authentication of the speech password succeeds, and the controller 82 controls the riding mowing device 100 to switch from the locked mode to the unlocked mode.

In some examples, the controller 82 is further configured to set a usage right of the preset password, where the usage right includes the preset number of times the preset password is used and/or a preset valid duration of the preset password. The user may set one or more preset passwords. For example, it may be set by the user that the preset password "start the mower" can be used only once or no more than ten times and the preset password "please begin to start the mower" can be used one thousand times, or the user may set the preset valid duration of the preset password "begin to start" to one week and the preset valid duration of the preset password "please begin to start the mower" to one month.

In some examples, the speech recognition module 83 is capable of generating a speech instruction based on the speech password. The controller 82 is capable of controlling the power supply assembly 20, the walking assembly 19, and the cutting assembly 13 according to the speech instruction. The user may control the working state of the riding mowing device 100 through speech so that it is convenient for the user to use the riding mowing device 100.

In some examples, when the speech recognition module 83 recognizes the speech password as a speech instruction to control the power supply assembly 20 to start or stop, the controller 82 is capable of controlling, according to the speech instruction, the power supply assembly 20 to start or stop. For example, when the speech instruction is "please begin to start the mower", the authentication module 81 determines that the speech password matches the preset password, and then the controller 82 can control, according to the speech instruction, the power supply assembly 20 to start. When the speech instruction is "please stop the mower", the authentication module 81 determines that the speech password matches the preset password, and then the controller 82 can control, according to the speech instruction, the power supply assembly 20 to stop.

In some examples, when the speech recognition module 83 recognizes the speech password as a speech instruction to control the walking assembly 19 to start, stop, or adjust a speed, the controller 82 is capable of controlling, according to the speech instruction, the walking assembly 19 to start, stop, or adjust the speed. For example, when the speech instruction is "please make the mower start walking", the authentication module 81 determines that the speech password matches the preset password, and then the controller 82 can control, according to the speech instruction, the walking assembly 19 to start. When the speech instruction is "please make the mower pause the walk", the authentication module 81 determines that the speech password matches the preset password, and then the controller 82 can control, according to the speech instruction, the walking assembly 19 to pause. When the speech instruction is "please speed up walking", the authentication module 81 determines that the speech password matches the preset password, and then the controller 82 can control, according to the speech instruction, the walking assembly 19 to speed up walking.

In some examples, when the speech recognition module 83 recognizes the speech password as a speech instruction to control the cutting assembly 13 to start or stop, the controller 82 is capable of controlling, according to the speech instruction, the cutting assembly 13 to start or stop. For example, when the speech instruction is "please begin to start cutting", the authentication module 81 determines that the speech password matches the preset password, and then the controller 82 can control, according to the speech instruction, the cutting assembly 13 to start. When the speech instruction is "please stop cutting", the authentication module 81 determines that the speech password matches the preset password, and then the controller 82 can control, according to the speech instruction, the cutting assembly 13 to stop.

In any one of the preceding examples, a power supply of each of the preceding one or more keyless start systems may include the power supply assembly or energy recovered by the riding mowing device when braking. In other examples, the power supply of the keyless start system 30 may include solar energy.

Figure 20:
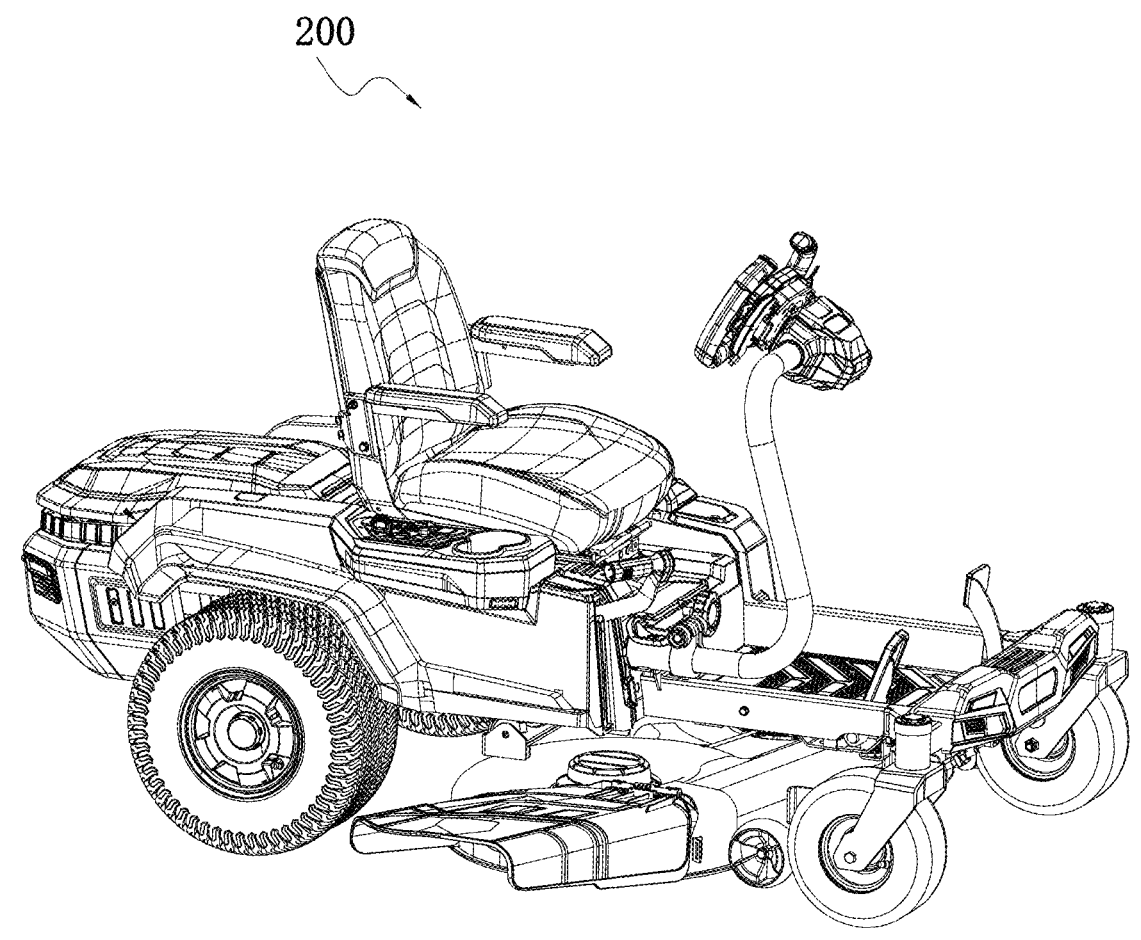
FIG. 20 is a perspective view of a riding mowing device in an example of the present application.
Figure 21:
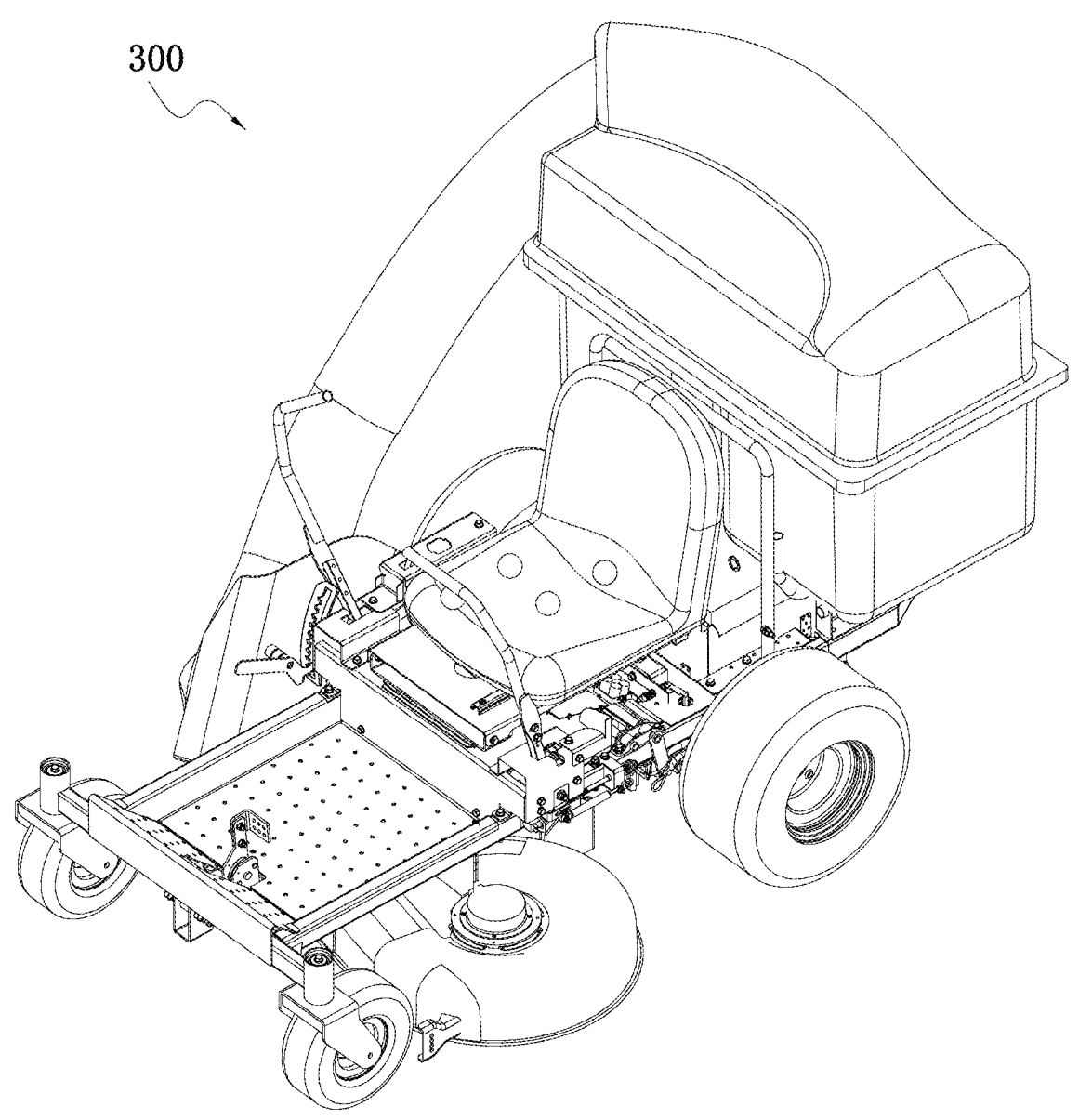
FIG. 21 is a perspective view of a riding mowing device in an example of the present application.

It is to be noted that the preceding are only preferred examples of the present application and the technical principles used therein. It is to be understood by those skilled in the art that the present application is not limited to the examples herein. For those skilled in the art, various apparent modifications, adaptations, and substitutions can be made without departing from the scope of the present application. For example, in some examples, the keyless start system in any one of the preceding examples is also applicable to a riding mowing device 200 shown in FIG. 20 or a riding mowing device 300 shown in FIG. 21. In some examples, the riding mowing device may include one or more keyless start systems described above. Therefore, while the present application is described in detail through the preceding examples, the present application is not limited to the preceding examples and may include more other equivalent examples without departing from the concept of the present application.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A riding mowing device, comprising:
a frame;
a cutting assembly comprising a deck and a mowing element at least partially accommodated in the deck;
a walking assembly used for driving the riding mowing device to walk;
a power supply assembly used for supplying power to at least the cutting assembly and the walking assembly and mounted to the frame; and
a keyless start system comprising an authentication module configured to authenticate validity of a smart key of a user, a broadcast module capable of broadcasting a predetermined signal, a broadcast switch module configured to enable and disable the broadcast module, and a controller electrically connected to the power supply assembly,
wherein the riding mowing device is capable of being controlled to switch from a locked mode to an unlocked mode after the smart key establishes a communication connection to the keyless start system, the keyless start system is configured to authenticate, through the authentication module, validity of a smart key entering a radiation region of the predetermined signal and control, through the controller, the riding mowing device to switch from the locked mode to the unlocked mode after the validity authentication of the smart key succeeds, and
wherein the controller controls the riding mowing device to switch from the locked mode to the unlocked mode after the validity authentication of the smart key succeeds, in the locked mode the controller prohibits the cutting assembly and/or the walking assembly from switching to a working state, and in the unlocked mode the controller allows the cutting assembly and/or the walking assembly to switch to the working state.

2. The riding mowing device according to claim 1, wherein in the unlocked mode the controller is capable of controlling the cutting assembly and/or the walking assembly to be in the working state or a braking state, in the working state the cutting assembly performs cutting work and/or the walking assembly drives the riding mowing device to walk, and in the braking state the cutting assembly does not perform the cutting work and the walking assembly does not drive the riding mowing device to walk.

3. The riding mowing device according to claim 1, wherein in the locked mode the controller prohibits the power supply assembly from supplying the power to the cutting assembly and/or the walking assembly and in the unlocked mode the controller allows the power supply assembly to supply the power to the cutting assembly and/or the walking assembly.

4. The riding mowing device according to claim 1, wherein the broadcast switch module is configured to, when the riding mowing device is in the unlocked mode, control the broadcast module to stop broadcasting the predetermined signal.

5. The riding mowing device according to claim 1, comprising a seat, wherein the broadcast switch module comprises a pressure sensing unit mounted to the seat, and the broadcast switch module is configured to, when the riding mowing device is in the locked mode and the pressure sensing unit detects that the seat bears pressure, control the broadcast module to begin broadcasting the predetermined signal.

6. The riding mowing device according to claim 1, wherein the smart key comprises a monitoring module configured to monitor the predetermined signal and a determination module configured to, when the predetermined signal is monitored by the monitoring module, determine that the smart key enters the radiation region, the predetermined signal is a signal broadcast by the riding mowing device in the radiation region, and the smart key entering the radiation region is used by the riding mowing device to control, based on a result of the validity authentication of the smart key, the riding mowing device to switch from the locked mode to the unlocked mode.

7. The riding mowing device according to claim 1, wherein the radiation region comprises a first region and a second region, a radial distance of the first region relative to the riding mowing device is greater than a radial distance of the second region relative to the riding mowing device, the keyless start system further comprises a connection module configured to be connected to the smart key, the connection module is pre-connected or connected to the smart key in the first region, and the authentication module performs identity verification on the smart key in the second region.

8. The riding mowing device according to claim 1, wherein the smart key is a digital key using Bluetooth or near-field communication (NFC) as a communication medium.

9. The riding mowing device according to claim 1, wherein the smart key is a low-frequency key using an electromagnetic wave as a communication medium.

10. The riding mowing device according to claim 1, wherein the smart key is a mobile terminal of the user and the mobile terminal establishes the communication connection to the keyless start system through wireless fidelity (Wi-Fi), NFC, or Bluetooth.

11. The riding mowing device according to claim 1, wherein the riding mowing device sends an alarm signal after the validity authentication of the smart key fails a plurality of times.

12. The riding mowing device according to claim 1, wherein the controller controls the riding mowing device to be in the locked mode within a preset time after the validity authentication of the smart key fails a plurality of times.

13. The riding mowing device according to claim 1, wherein the smart key comprises an operation button and the operation button is capable of transmitting a remote control signal to the keyless start system so as to control the riding mowing device to work.

14. The riding mowing device according to claim 13, wherein the remote control signal comprises signals for controlling the power supply assembly, the walking assembly, and the cutting assembly.

* * * * *